US008150263B2

(12) United States Patent
Kobayashi et al.

(10) Patent No.: US 8,150,263 B2
(45) Date of Patent: Apr. 3, 2012

(54) OPTICAL CODE DIVISION MULTIPLEX SIGNAL GENERATOR

(75) Inventors: Shuko Kobayashi, Kanagawa (JP); Kensuke Sasaki, Kanagawa (JP)

(73) Assignee: Oki Electric Industtry Co., Ltd., Tokyo (JP)

( * ) Notice: Subject to any disclaimer, the term of this patent is extended or adjusted under 35 U.S.C. 154(b) by 275 days.

(21) Appl. No.: 12/695,523

(22) Filed: Jan. 28, 2010

(65) Prior Publication Data
US 2010/0215370 A1   Aug. 26, 2010

(30) Foreign Application Priority Data
Nov. 4, 2008   (JP) .................................. 2008-282875

(51) Int. Cl.
*H04J 14/00* (2006.01)
(52) U.S. Cl. ............ 398/77; 398/78; 398/183; 398/188; 398/190; 385/24; 385/37; 341/137; 341/140
(58) Field of Classification Search ............ 398/77, 398/78, 79, 182, 183, 188, 190, 191, 98, 398/99, 74, 75, 76, 89, 87, 189, 82, 84, 135, 398/136, 192, 193, 200, 201; 385/24, 37, 385/27; 341/137, 140, 142
See application file for complete search history.

(56) References Cited

U.S. PATENT DOCUMENTS
7,792,427 B1 *   9/2010   Uhlhorn et al. .................. 398/77
2005/0100338 A1 *   5/2005   Yeon et al. ....................... 398/78

OTHER PUBLICATIONS
Arbab, Vahid et al., "Variable Bit Rate Optical CDMA Networks Using Multiple Pulse Position Modulation", Department of Electrical Engineering-Systems, University of Southern California, Los Angeles, CA, 2007.
Wada, Naoya et al., "10Gbit/s Optical Code Division Multiplexing Using 8-Chip BPSK-Code With Time-Gating Detection", ECOC'98, Sep. 20-24, 1998, Madrid, Spain, pp. 335-336.

* cited by examiner

*Primary Examiner* — Hanh Phan
(74) *Attorney, Agent, or Firm* — Rabin & Berdo, P.C.

(57) ABSTRACT

An optical code division multiplexing signal generator provided with an optical pulse light source, a first encoder to an $N^{th}$ encoder, a first optical modulator to an $N^{th}$ optical modulator, and a first optical circulator to an $N^{th}$ optical circulator. The first optical circulator inputs an input optical pulse train to a first encoder, and inputs a first encoded optical pulse train output by Bragg reflection from the first encoder to the first optical modulator. The $k^{th}$ optical circulator inputs an input $(k-1)^{th}$ optical pulse train which has passed through the $(k-1)^{th}$ encoder to a $k^{th}$ encoder, and inputs a $k^{th}$ encoded optical pulse train output by Bragg reflection from the $k^{th}$ encoder to the $k^{th}$ optical modulator. Herein k takes all integers from 2 to N, and N is a positive integer of 2 or more.

4 Claims, 13 Drawing Sheets

POSITIONAL COORDINATES ON OPTICAL FIBER LENGTH DIRECTION

OPTICAL CODE DIVISION MULTIPLEX SIGNAL GENERATOR

CROSS-REFERENCE TO RELATED APPLICATION

This application is based on Japanese Patent Application No. 2008-282875 filed on Nov. 4, 2008, the disclosure of which is incorporated by reference herein.

BACKGROUND OF THE INVENTION

1. Field of the Invention

The present invention relates to a device that generates an optical code multiplex signal by encoding optical pulse signals for each transmission channel and then multiplexing these.

2. Description of the Related Art

Recently, communication needs are rapidly expanding, due to the spreading of the internet and the like, and in response, high speed, high capacity networks employing optical fibers are being installed. Since the volume of communication is increasing, optical multiplexing technology that bundles together plural communication channels worth of optical pulse signals, and transmits these along the transmission path of a single optical fiber, is being seen as important. Communication channel is sometimes referred to below simply as channel.

As optical multiplexing technology, research being carried out into Optical Time Division Multiplexing (OTDM), Wavelength Division Multiplexing (WDM), and Optical Code Division Multiplexing (OCDM).

Out of these technologies, OCDM has operational flexibility in that there is no limit to the number of optical pulse signals for transmission and reception allocatable to a single bit on the time axis. Furthermore, OCDM has the feature that plural channels can be set for the same time slot on the time axis, or plural channels can set with the same wavelength on the wavelength axis.

OCDM is a communications method that allocates a different code (pattern) to each channel, and extracts a signal by pattern matching. Namely, OCDM is an optical multiplexing technology that encodes an optical pulse signal with a different code for each channel at the transmission side, and employs the same code for decoding at the reception side as that of the transmission side in order to recover the original optical pulse signal.

According to OCDM, when decoding, only optical pulse signals that match the code, when encoding was performed, may be extracted and processed as valid signals. Therefore, optical pulse signals of the same wavelength, or an optical pulse signal of a combination of plural wavelengths, may be allocated across plural channels. Furthermore, according to OCDM, since the same code needs to be used when decoding at the reception side as the code employed for encoding, decoding cannot be performed unless this code is known. Consequently, OCDM is also an excellent transmission method in terms of data security.

In an OCDM communications method using a phase code, the following steps may be performed. First, output from a continuous wave light source at the transmission side is converted into an optical pulse train, and then, based on this optical pulse train, an electrical transmission signal, this being a binary digital signal, is converted into a return to zero (RZ) format optical pulse signal, generating an optical pulse signal to be transmitted. The RZ format optical pulse signal is sometimes referred to below simply as an optical pulse signal.

Next, encoding is performed to the optical pulse signal to be transmitted with an encoder, converting the optical pulse signal into an encoded optical pulse signal, and this is transmitted.

At the receiving side, the encoded optical pulse signal is received, and the encoded optical pulse signal is decoded with a decoder set with the same code as the code set in the above encoder, recovering the transmitted optical pulse signal.

Encoding and time spreading are now defined for the purpose of the following explanation. Encoding of an optical pulse train or optical pulse signal by an encoder is converting each of the individual optical pulses configuring the optical pulse train or the optical pulse signal into plural individual optical pulses arranged over the time axis. Conversion of a single optical pulse into plural individual optical pulses arranged over the time axis is called time spreading the optical pulse, and each of the individual optical pulses generated by time spreading is called a chip pulse.

A decoder converts the individual chip pulses respectively into plural individual chip pulse trains on the time axis, and decodes the encoded optical pulse signal by interfering the chip pulses on the time axis that are superimposed, from the chip pulses that have been time spread and generated from the plural individual chip pulses.

Consequently, the encoder and decoder are common from the standpoint of having functionality to time spread a single optical pulse and generate plural chip pulses arranged over the time axis. Except in instances where there is a particular need to discriminate between encoders and decoders in the explanation, there are occasions where optical pulse time spreading device will be used for both an encoder and a decoder, meaning a device that converts an optical pulse into a chip pulse train.

As an optical pulse time spreading device, a generally employed configuration is a Superstructured Fiber Bragg Grating (SSFBG) configured unit Fiber Bragg Gratings (FBG's) and phase shifters, repetitively disposed alternately in a straight line along on optical fiber waveguide direction. Unit FBG here refers to a portion of a continuous FBG where there is not a change in an effective index modulation period, or a portion of a continuous FBG where there is no discontinuity in phase present, midway in an optical fiber.

The FBG sections only periodically modulate the refractive index of the core of an optical fiber, and the geometry is the same as that of optical fibers employed as an optical communications transmission paths in OCDM. Consequently, by employing an FBG as a configuration element of an optical communications device, connecting FBG's to the optical transmission paths is the same as connecting optical fibers together. Connecting optical fibers together is markedly easier than connecting an optical waveguide path other than an optical fiber, such as, a Planer Lightwave Circuit (PLC) or the like, to an optical fiber. This is one of the main reasons that SSFBG's are generally employed as optical pulse time spreading devices.

As described above, the functionality of an encoder and a decoder is common to both, and when employed in an OCDM communications system, the disposed location within the system determines the role. In other words, an optical pulse time spreading device disposed on the transmission side functions as an encoder, and an optical pulse time spreading device disposed on the reception side functions as a decoder.

As a method for generating an optical pulse train, as well as the method of generation by modulating the output a continuous wave light source using an optical modulator, as described above, there is also the method of directly generating an optical pulse train using a mode locked semiconductor laser.

Furthermore, in place of generating a RZ format optical pulse signal and encoding this optical pulse signal, as described above, an optical pulse train may be coded to generate an encoded optical pulse train by modulating the encoded optical pulse train with an electrical transmission signal which is a binary digital signal. In this manner, no matter whether the encoded optical pulse signal is generated using a method of encoding after generating the optical pulse signal, or whether an encoded optical pulse signal is generated by modulating with an electrical transmission signal after encoding an optical pulse train, the same encoded optical pulse signal is generated due to the following reason.

That is, if the RZ format optical pulse signal is denoted D, and a code denoted C, then encoding the optical pulse signal D with the code C is equivalent to deriving the product D×C. Consequently, generating the optical pulse signal D and encoding this optical pulse signal with code C, is equivalent to deriving the product D×C. Further. encoding an optical pulse train, modulating the generated encoded optical pulse train with an electrical transmission signal, this being a binary digital signal, and generating an encoded optical pulse signal, is equivalent to deriving the product C×D. Deriving the product D×C and deriving the product C×D is equivalent to both resulting in generation of the same encoded optical pulse signal.

In an OCDM communications method employing a phase code, the optical pulse signal is dispersed by an encoder over the time axis, according to a given rule set in the encoder, and thereby converted into an encoded optical pulse signal. In such cases, the given rule is determined by the code.

The following method is known as a specific generating method for an OCDM signal in an OCDM communications system. In this method, first, an optical pulse train is generated by a pulse light source of optical pulses periodically arranged over the time axis, then this optical pulse train is divided up into divisions of the number of channels. Then, by modulating the respective divisions of the optical pulse train, a digital optical pulse signal is generated for each of the channels. A multiplexed OCDM signal is generated in this method by multiplexing these digital optical pulse signals with an optical coupler (see, for example, FIG. 5 in "Variable Bit Rate Optical CDMA Networks Using Multiple Pulse Position Modulation", by Vahid R. Arbab, Poorya Saghari, Narender M. Jayachandran, Alan E. Willner, published in Tech. Dig., OFC'07, 2007, OM06. (Document 1)).

Furthermore, the following method, different from the generating method described above, is known for generating an OCDM signal. In this method, first, a digital optical pulse signal is generated for each of the channels by employing transmitters including a pulse light source and an optical modulator, with the same number of transmitters employed as the number of channels. Then the digital optical pulse signals generated thereby are encoded with different codes for each of the channels, generating encoded optical pulse signals. A multiplexed OCDM signal is generated in this method by multiplexing these encoded optical pulse signals for all of the channels with an optical coupler (see, for example, FIG. 1 in "10 Gbits/s OPTICAL CODE DIVISION MULTIPLEXING USING 8-CHIP BPSK-CODE WITH TIME-GATING DETECTION", by N. Wada, K. Kitayama, and H. Kurita, published in Tech. Dig., ECOC'98, pp. 335-336, 1998. (Document 2)).

In a conventional device for generating OCDM communications signals, a loss of energy occurs in the optical carrier wave configuring respective optical pulse trains, or optical pulse signals, at the stage at which an optical pulse train is divided into divisions of the number of channels, and at the stage where the optical pulse train, or the optical pulse signal, for each of the channels is encoded by a different code.

Therefore, the intensity of the OCDM transmission signal, which is the communications signal, is weakened. Consequently, in a conventional OCDM transmission system countermeasures are undertaken, such as, amplifying the OCDM transmission signal, by use of an optical amplifier at a stage prior to transmission, or the like. An optical amplifier for amplifying the OCDM transmission signal in Document 1, introduces the section of Erbium Doped Fiber Amplifier (EDFA) of FIG. 5 in order to amplify the OCDM transmission signal, and in Document 2, introduces the section of EDF of FIG. 2 in order to amplify the OCDM transmission signal.

When the OCDM transmission signal is amplified, such as by an amplifier of the like, as well as various technical issues arising, such as the introduction of noise during amplification, the manufacturing costs of such a device and the operational costs thereof are also raised.

SUMMARY OF THE INVENTION

The present invention provides an OCDM signal generator that generates and outputs a higher intensity OCDM transmission signal than that of a conventional OCDM signal generator, due to a configuration that enables a reduction in the energy loss in the optical carrier wave.

The present inventors have discovered that it is possible to dramatically reduce the energy loss in an optical carrier wave in optical pulse time spreading devices by adopting a configuration in which an optical splitter is not required to split an optical pulse train into divisions of the number of channels, and enables the optical signal component that has passed through an optical pulse time spreading device to be reused for encoding in a separated optical pulse time spreading device.

An optical code division multiplexing signal generator of a first aspect of the present invention includes an optical pulse light source that generates and outputs an optical pulse train, a first encoder to an $N^{th}$ encoder, a first optical modulator to an $N^{th}$ optical modulator, and a first optical circulator to an $N^{th}$ optical circulator.

The first optical circulator is input with the optical pulse train and inputs the optical pulse train to the first encoder, and he first optical circulator is input with a first encoded optical pulse train output by Bragg reflection from the first encoder and inputs the first encoded optical pulse train to the first optical modulator.

A $k^{th}$ optical circulator is configured so as to be input with a $(k-1)^{th}$ optical pulse train that has passed through the $(k-1)^{th}$ encoder and input the $(k-1)^{th}$ optical pulse train to the $k^{th}$ encoder, and to be input with a $k^{th}$ encoded optical pulse train output by Bragg reflection from the $k^{th}$ encoder and input the $k^{th}$ encoded optical pulse train to the $k^{th}$ optical modulator.

Here, k takes all integers from 2 to N, and N is an integer of 2 or more.

The OCDM signal generator of the present aspect may be provided with up to a maximum of N individual encoders, modulators, and optical circulators, respectively. Preferably configuration is made with a first encoder to an $M^{th}$ encoder, a first optical modulator to an $M^{th}$ optical modulator, and a first optical circulator to an $M^{th}$ optical circulator for the encoders, optical modulators and optical circulators, respectively, and preferably the first to the $M^{th}$ encoders are configured as follows.

Namely, each of the first to the $M^{th}$ encoders are respectively optical pulse time spreading devices provided with an SSFBG configured by disposing a first unit FBG to an $N^{th}$ unit FBG with a structure in which the effective refractive index of the optical fiber periodically changes along the length direction of the optical fiber, and with disposing respective phase shifters having a constant refractive index between an $i^{th}$ unit FBG and an $(i+1)^{th}$ unit FBG.

The optical pulse time spreading devices have functionality to time spread and output an optical pulse input to the SSFBG as a chip pulse train which includes N individual chip pulses form from a first chip pulse to an $N^{th}$ chip pulse that are time spread and arranged in sequence over the time axis. In the SSFBG the spacing of the adjacently disposed $i^{th}$ unit FBG and the $(i+1)^{th}$ unit FBG is such that the phase difference between the chip pulse generated by reflection at the $i^{th}$ unit FBG and the chip pulse generated by reflection at the $(i+1)^{th}$ unit FBG is $\pi(2M-1)/N$.

Here, i is a parameter that takes all integer values for which $1 \leq i \leq N-1$, N is an integer of 2 or more, k is a parameter that takes all integers satisfying $2 \leq k \leq M$, and M is an integer taking all values that satisfy $2 \leq M \leq N$.

In the following explanation, the terms encoding and decoding are used with a meaning broader than the traditionally used conventional meaning. Namely, a rule for spreading the optical pulse configuring the optical pulse signal on the time axis is not limited to code of the usual meaning (sometimes referred to as code as narrowly defined), and any rule giving unambiguously determination (sometimes referred to code as broadly defined) is used with the above terms encoding or decoding. Consequently, terms of encoded optical pulse signal, chip pulse and the like are also used for code as broadly defined.

In the following explanation, the chip pulse train output from the encoders configuring the OCDM signal generator of the present exemplary embodiment include also chip pulses that are not generated when an optical pulse is time spread based on a code of the strictest sense, as in the case when chip pulse trains are output from an encoder set with a code as usually defined. However, in the explanation that follows, for convenience, sometimes conversion of an optical pulse to a chip pulse train is called encoding, and generation of a chip pulse train as an autocorrelation wave or cross-correlation wave is called decoding.

In the OCDM signal generator of a second aspect of the present invention is configured such that the first to the $N^{th}$ optical modulators provided to the OCDM signal generator of the first aspect are unified into a single optical modulator, and similar processing is performed thereby.

Namely, the OCDM signal generator of the second aspect includes an optical pulse light source that generates and outputs an optical pulse train, a first to an $N^{th}$ encoder, an optical modulator, and a first to an $N^{th}$ optical circulator. The first to the $N^{th}$ encoder, and the first to the $N^{th}$ optical circulator are similar to those of the OCDM signal generator of the first aspect described above.

In the OCDM signal generator of the second aspect too, up to a maximum of N individual encoders and optical circulators may be provided, respectively, and preferably a first to an $M^{th}$ encoder and a first to an $M^{th}$ optical circulator are provided for the encoders and optical circulators, respectively, and preferably the first to the $M^{th}$ encoders are configured similarly to the first to the $M^{th}$ encoders provided to the first OCDM signal generator.

BRIEF DESCRIPTION OF THE DRAWINGS

Exemplary embodiments of the present invention will be described in detail based on the following figures, wherein:

FIG. 3A is a schematic cross-section of an SSFBG, FIG. 3B is a diagram schematically showing effective index modulation structure of the SSFBG, and FIG. 3C is a diagram in which a portion of the effective index modulation structure of the core of an optical fiber is depicted enlarged;

FIG. 6A is the wavelength spectrum of the optical pulse train input to a first encoder, FIG. 6B is the wavelength spectrum of the optical pulse train passing through the first encoder, FIG. 6C is the wavelength spectrum of the optical pulse train passing through a second encoder, and FIG. 6D is the wavelength spectrum of the optical pulse train passing through a third encoder;

FIG. 9A shows the wavelength spectrum of chip pulses output from an encoder in which a code A is set, and FIG. 9B shows the wavelength spectrum of chip pulses output from an encoder in which a code B is set;

FIG. 10A is a diagram of the wavelength spectrum of the optical pulse train passing through the first encoder, FIG. 10B is a diagram the wavelength spectrum of the optical pulse train passing through the second encoder, and FIG. 10C is a diagram showing the wavelength spectrum of the optical pulse train passing through the third encoder. FIG. 10D is a diagram of the wavelength spectrum of the encoded optical pulse train output by Bragg reflection from the second encoder, FIG. 10E is a diagram of the wavelength spectrum of the encoded optical pulse train output by Bragg reflection from the third encoder, FIG. 10F is a diagram of the wavelength spectrum of the encoded optical pulse train output by Bragg reflection from the third encoder, and FIG. 10F is a diagram showing the wavelength spectrum of the encoded optical pulse train output by Bragg reflection from the fourth encoder;

FIG. 13A is a diagram to accompany explanation of the operation principles of encoding and decoding, FIG. 13B is a diagram showing the time waveform of chip pulses a', b', c' and d' Bragg reflected from respective unit FBG's 146a, 146b, 146c, and 146d, and FIG. 13C shows the time waveform of an autocorrelation wave of an input optical pulse decoded in the decoder 146;

FIG. 14A is a diagram to accompany explanation of the operation principles, FIG. 14B is a diagram showing the time waveform of chip pulses a', b', c' and d' Bragg reflected from respective unit FBG's 156a, 156b, 156c, and 156d, and FIG. 14C shows a cross-correlation wave of an input optical pulse decoded in the decoder.

DETAILED DESCRIPTION OF THE INVENTION

Figure 1:
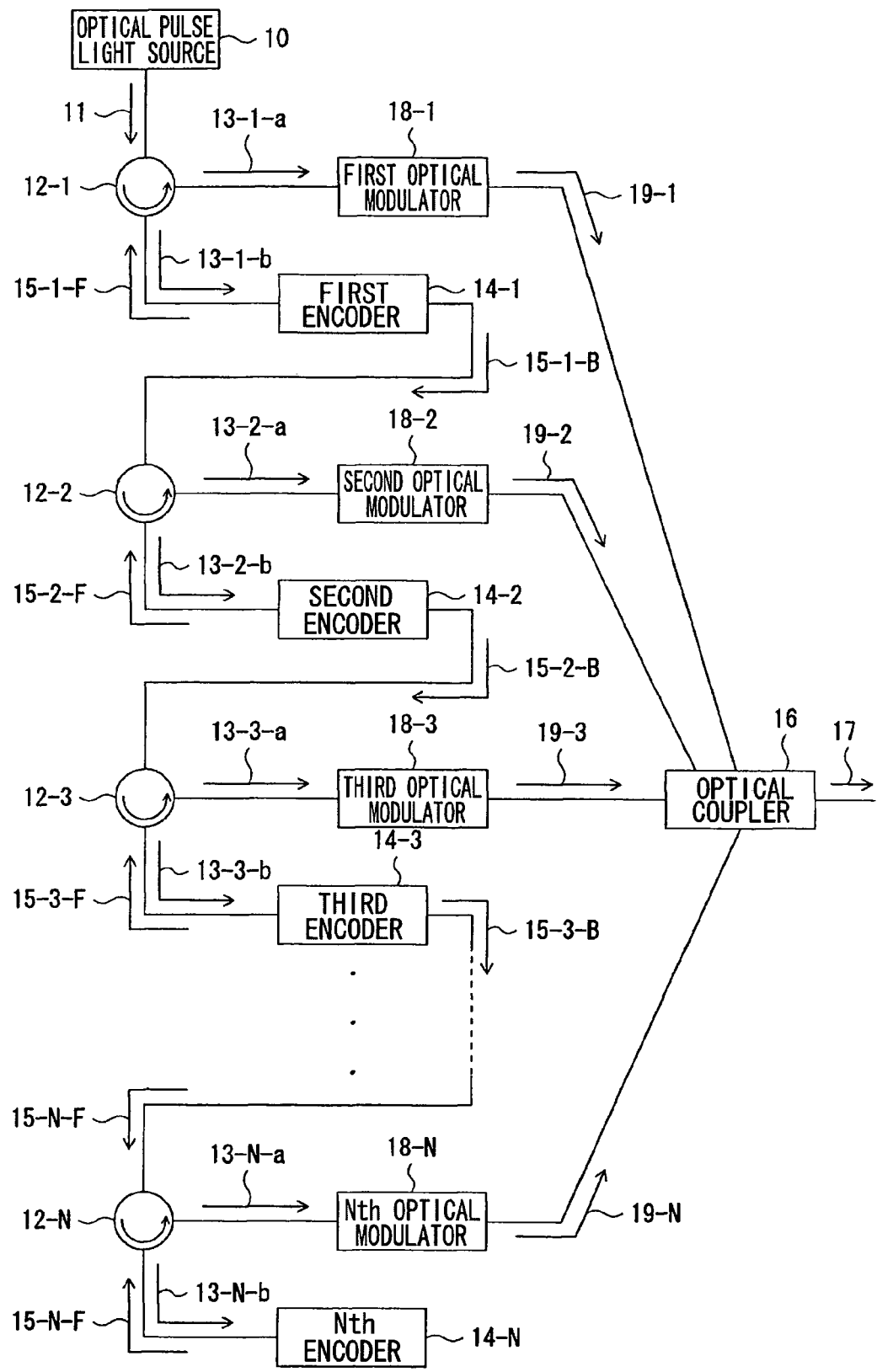
FIG. 1 is a schematic block configuration diagram of an OCDM signal generator of a first exemplary embodiment.

Explanation follows regarding an exemplary embodiment, with reference to schematic block configuration diagrams and the like, however the exemplary embodiments of the present invention are not limited by each of the drawings. In multiple drawings, similar configuration elements are shown allocated with the same reference numerals, and sometimes repeated explanation thereof is omitted. Furthermore, in the following explanation, there are occasions when particular conditions and the like are employed, however these conditions are no more than preferable examples thereof, and there is therefore no limitation to these conditions. Note that in the following explanation, N is an integer of 2 or more, k is a parameter that adopts all integer values satisfying $2 \leqq k \leqq M$, and M is adopts all integers satisfying $2 \leqq M \leqq N$.

OCDM Signal Generator

Explanation follows of and operation of an OCDM signal generator of a first exemplary embodiment, with reference to FIG. 1. FIG. 1 is a schematic block configuration diagram of an OCDM signal generator of the first exemplary embodiment.

The OCDM signal generator of the first exemplary embodiment includes: an optical pulse light source 10 that generates and outputs an optical pulse train; a first encoder 14-1 to an $N^{th}$ encoder 14-N; a first optical modulator 18-1 to an $N^{th}$ optical modulator 18-N; and a first optical circulator 12-1 to an $N^{th}$ optical circulator 12-N.

The first optical circulator 12-1A is input with an optical pulse train 11 output from the optical pulse light source 10. The optical pulse train 11 is input to as an optical pulse train 13-1-b to the first encoder 14-1 via the first optical circulator 12-1. A first encoded optical pulse train 15-1-F that is output by Bragg reflection from the first encoder 14-1 is input as a first encoded optical pulse train 13-1-a to the first optical modulator 18-1 via the first optical circulator 12-1.

The optical pulse train 11 and the optical pulse train 13-1-b have input and output relationships to the first optical circulator 12-1, and are the same as each other as optical pulse trains. Furthermore, the first encoded optical pulse train 15-1-F and the first encoded optical pulse train 13-1-a have input and output relationships to the first optical circulator 12-1, and are the same as each other as encoded optical pulse trains.

Consequently, the first optical circulator 12-1 has functionality to receive input of the optical pulse train 11 and to input this optical pulse train 11 to the first encoder 14-1, and to receive input of the first encoded optical pulse train 15-1-F output by Bragg reflection from the first encoder 14-1 and to input this first encoded optical pulse train 15-1-F to the first optical modulator 18-1.

As shown in FIG. 1, with respect to the second optical circulator 12-2 to the $N^{th}$ optical circulator 12-N, the optical pulse train that has passed through the respective previous stage encoder is input thereto, in place of the input light, this being the optical pulse train 11, that is input to the first optical circulator 12-1. Similarly to the first encoder 12-1, the second optical circulator 12-2 to the $N^{th}$ optical circulator 12-N receive the respective encoded optical pulse trains output by Bragg reflection from the second encoder 14-2 to the Nth encoder 14-N, and input these to the second optical modulator 18-2 to the Nth optical modulator 18-N.

The second optical circulator 12-2 is input with the optical pulse train 15-1-B, and the optical pulse train 15-1-B is input as an optical pulse train 13-2-b to the second encoder 14-2 via the second optical circulator 12-2. The second encoded optical pulse train 15-2-F output by Bragg reflection from the second encoder 14-2 is input as the second encoded optical pulse train 13-2-a to the second optical modulator 18-2 via the second optical circulator 12-2.

The optical pulse train 15-1-B and the optical pulse train 13-2-b have input and output relationships to the second optical circulator 12-2, and are the same as each other as optical pulse trains. The second encoded optical pulse train 15-2-F and the second encoded optical pulse train 13-2-a have input and output relationships to the second optical circulator 12-2, and are the same as each other as optical pulse trains.

Consequently, the second optical circulator 12-2 has functionality to receive input of the optical pulse train 15-1-B, to input this optical pulse train 15-1-B to the second encoder 14-2, and to receive input of the second encoded optical pulse train 15-2-F output by Bragg reflection from the second encoder 14-2, and to input this second encoded optical pulse train 15-2-F to the second optical modulator 18-2.

The third optical circulator 12-3 to the $N^{th}$ optical circulator 12-N are similar thereto. Namely, if the functionality of the second optical circulator 12-2 to the $N^{th}$ optical circulator 12-N is written in general terms, then it can be expressed at the following.

Configuration is made such that the $k^{th}$ optical circulator is input with the $(k-1)^{th}$ optical pulse train that has passed through the $(k-1)^{th}$ encoder, inputs the $(k-1)^{th}$ optical pulse train to the $k^{th}$ encoder, and is input with the $k^{th}$ encoded optical pulse train output by Bragg reflection from the $k^{th}$ encoder, and inputs the $k^{th}$ encoded optical pulse train to the $k^{th}$ optical modulator.

A first encoded optical pulse signal 19-1 to an $N^{th}$ encoded optical pulse signal 19-N output from the first optical modulator 18-1 to the $N^{th}$ optical modulator 18-N are input to an optical coupler 16 and multiplexed, and an OCDM signal 17 is generated and output.

Figure 2:
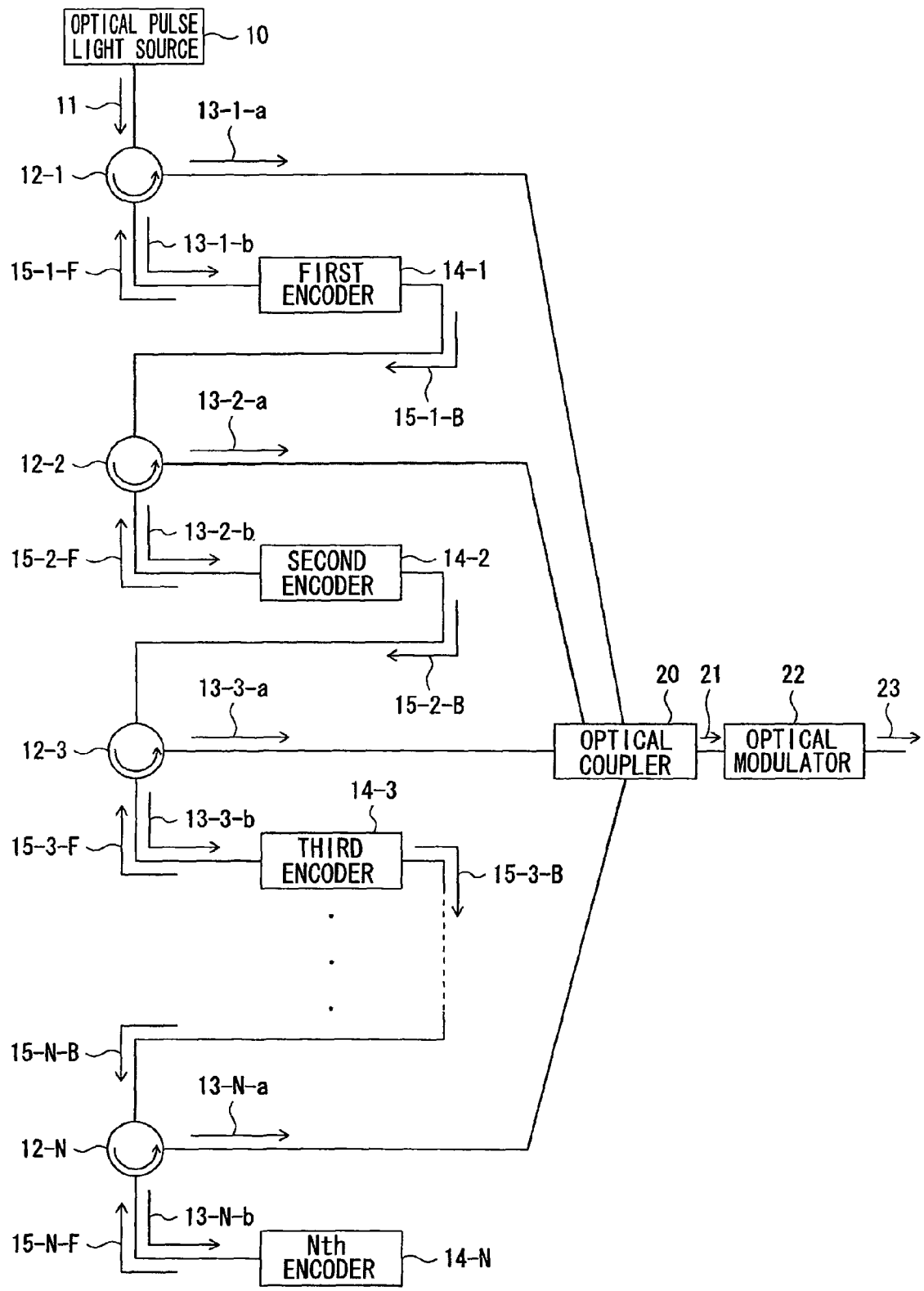
FIG. 2 is a schematic block configuration diagram of an OCDM signal generator of a second exemplary embodiment.

Explanation follows of configuration and operation of an OCDM signal generator of a second exemplary embodiment, with reference to FIG. 2. FIG. 2 is a schematic block configuration diagram of an OCDM signal generator of the second exemplary embodiment.

The OCDM signal generator of the second exemplary embodiment includes: an optical pulse light source 10 that generates and outputs an optical pulse train; a first encoder 14-1 to an $N^{th}$ encoder 14-N; an optical modulator 22; and a first optical circulator 12-1 to an $N^{th}$ optical circulator 12-N.

An optical pulse train 11 output from the optical pulse light source 10 is input to the first optical circulator 12-1. The optical pulse train 11 is input as an optical pulse train 13-1-$b$ to the first encoder 14-1 via the first optical circulator 12-1. A first encoded optical pulse train 15-1-F that is output by Bragg reflection from the first encoder 14-1 is input as a first encoded optical pulse train 13-1-$a$ to an optical coupler 20 via the first optical circulator 12-1.

The optical pulse train 11 and the optical pulse train 13-1-$b$ have input and output relationships to the first optical circulator 12-1, and are the same as each other as optical pulse trains. Furthermore, the first encoded optical pulse train 15-1-F and the first encoded optical pulse train 13-1-$a$ have input and output relationships to the first optical circulator 12-1, and are the same as each other as optical pulse trains.

Consequently, the first optical circulator 12-1 has functionality to receive input of the optical pulse train 11 and to input this optical pulse train 11 to the first encoder 14-1, and to receive input of the first encoded optical pulse train 15-1-F output by Bragg reflection from the first encoder 14-1 and to input this first encoded optical pulse train 15-1-F to the optical coupler 20.

As shown in FIG. 2, with respect to the second optical circulator 12-2 to the $N^{th}$ optical circulator 12-N, the optical pulse train that has passed through the respective previous stage encoder is input thereto, in place of the optical pulse train 11 that is input to the first optical circulator 12-1. Similarly to the first encoder 12-1, the second optical circulator 12-2 to the $N^{th}$ optical circulator 12-N receive the respective encoded optical pulse trains output by Bragg reflection from the second encoder 14-2 to the Nth encoder 14-N, and input these to the optical coupler 20.

The optical pulse train 15-1-B is input to the second optical circulator 12-2. The optical pulse train 15-1-B is input as an optical pulse train 13-2-$b$ to the second encoder 14-2 via the second optical circulator 12-2. The second encoded optical pulse train 15-2-F output by Bragg reflection from the second encoder 14-2 is input as the second encoded optical pulse train 13-2-$a$ to the optical coupler 20 via the second optical circulator 12-2.

The optical pulse train 15-1-B and the optical pulse train 13-2-$b$ have input and output relationships to the second optical circulator 12-2, and are the same as each other as optical pulse trains. The second encoded optical pulse train 15-2-F and the second encoded optical pulse train 13-2-$a$ have input and output relationships to the second optical circulator 12-2, and are the same as each other as optical pulse trains.

Consequently, the second optical circulator 12-2 has functionality to receive input of the optical pulse train 15-1-B and to input this optical pulse train 15-1-B to the second encoder 14-2, and to receive input of the second encoded optical pulse train 15-2-F output by Bragg reflection from the second encoder 14-2 and to input this second encoded optical pulse train 15-2-F to the optical coupler 20.

The third optical circulator 12-3 to the $N^{th}$ optical circulator 12-N are similar thereto. Namely, if the functionality of the second optical circulator 12-2 to the $N^{th}$ optical circulator 12-N is written in general terms, then it can be expressed at the following.

Configuration is made such that the $k^{th}$ optical circulator is input with the $(k-1)^{th}$ optical pulse train that has passed through the $(k-1)^{th}$ encoder, inputs the $(k-1)^{th}$ optical pulse train to the $k^{th}$ encoder, and is input with the $k^{th}$ encoded optical pulse train output by Bragg reflection from the $k^{th}$ encoder, and inputs the $k^{th}$ encoded optical pulse train to the optical coupler 20.

As described above, the optical coupler 20 is input with the first encoded optical pulse train 13-1-$a$ to the $N^{th}$ optical pulse train 13-1-N-$a$, multiplexes, and a multiplexed encoded optical pulse signal 21 is generated and output from the optical coupler 20. The multiplexed encoded optical pulse signal 21 is input to the optical modulator 22 and an OCDM signal 23 is generated and output.

The OCDM signal generator of the second exemplary embodiment is configured with a single optical modulator that unifies the first to the $N^{th}$ optical modulators provided in the OCDM signal generator of the above first exemplary embodiment. Regarding modes of industrial use of such an OCDM signal generator, preferably application is made to applications where the same contents, such as a movie or the like, is transmitted by the first to the $N^{th}$ channels. However, since there are generally few cases like this where the contents of the data transmitted is the same for the first to the $N^{th}$ channels, the OCDM signal generator of the first exemplary embodiment will be used as an example in the following explanation of the exemplary embodiments. Furthermore, except in instances where it is particularly necessary in the following explanation to discriminate between the OCDM signal generator of the first exemplary embodiment and the OCDM signal generator of the second exemplary embodiment, reference will simply be made to an OCDM signal generator, without limitation to the first or the second thereof.

The difference between the OCDM signal generator of the first exemplary embodiment and the OCDM signal generator of the second exemplary embodiment is whether an optical modulator is provided for each of the first to the $N^{th}$ channels, or these are configured as a unified single optical modulator that transmits data of the same contents. However, the feature of the OCDM signal generators of the present exemplary embodiments is not whether there is functionality for transmitting data separately for each of the channels, or whether there is functionality for transmitting data of the same contents in each of the channels. The point regarding the OCDM signal generators of the present exemplary embodiments is that configuration is made to input the optical pulse train that has passed through the encoder disposed at the previous stage to the encoder disposed at the following stage. Since this feature is common to the configuration of the OCDM signal generators of both the first and the second exemplary embodiments, the feature of the present invention may be explained by explaining the example of the OCDM signal generator of the first exemplary embodiment.

Each of the OCDM signal generators of the exemplary embodiments may be provided with up to a maximum of N individual respective encoders, optical modulators, optical circulator, and may be Configured with the encoders, optical modulators, and optical circulators provided as the first encoder 14-1 to the $M^{th}$ encoder 14-M, the first optical modulator 18-1 to the $M^{th}$ optical modulator 18-M, the first optical circulator 12-1 to the M$^{th}$ optical circulator 12-M, and with the first encoder 14-1 to the M$^{th}$ encoder 14-M configured as below.

Each of the first encoder 14-1 to the M$^{th}$ encoder 14-M is an optical pulse time spreading device provided with an SSFBG. The SSFBG is configured of a first unit FBG to an N$^{th}$ unit FBG with a structure that the effective refractive index of the optical fiber periodically changes disposed along the length direction of the optical fiber, and with respective phase shifters having a constant refractive index disposed between an i$^{th}$ unit FBG and an (i+1)$^{th}$ unit FBG.

The optical pulse time spreading device has functionality for time spreading and outputting an optical pulse input to the SSFBG as a chip pulse train made up from N individual chip pulses from a first to an N$^{th}$ chip pulse arranging in sequence over the time axis.

SSFBG Structure

Figure 3A:
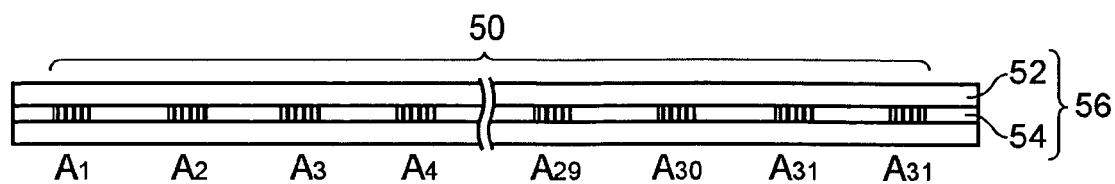
FIG. 3A to FIG. 3C are diagrams to accompany explanation of the structure of an SSFBG
Figure 3B:
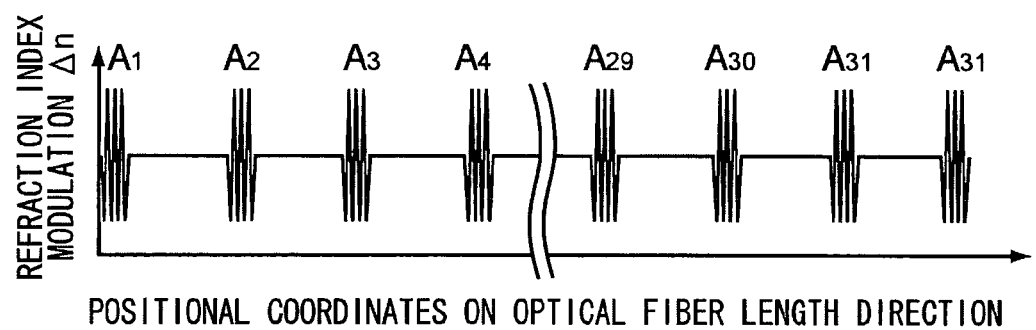
Figure 3C:
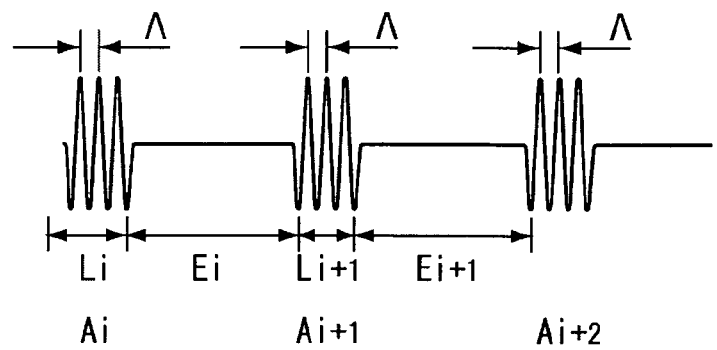

Explanation follows, with reference to FIG. 3A to FIG. 3C, of an SSFBG structure configured with the respective first encoder 14-1 to the M$^{th}$ encoder 14-M. For ease of explanation, a configuration of an SSFBG 50 built into a core 54 of an optical fiber 56, provided with the core 54 and cladding 52, will be explained.

FIG. 3A to FIG. 3C are diagrams to accompany explanation of the SSFBG structure. FIG. 3A is a schematic cross-section of the SSFBG 50, FIG. 3B is a diagram schematically showing the effective index modulation structure of the SSFBG 50, and FIG. 3C is a diagram in which a portion of the effective index modulation structure of the core 54 of the optical fiber 56 is depicted enlarged. The SSFBG 50 is configured built into the core 54 of the optical fiber 56, provided with the core 54 and the cladding 52. In the SSFBG 50 shown in FIG. 3A, the 31 individual unit FBG's are disposed in a straight line along the waveguide direction of the core 54, which is the optical waveguide path of the optical fiber 56. These 31 individual unit FBG's, from the first to the 31$^{st}$ unit FBG's, are distinguished between by appending sequential references from $A_1$ to $A_{31}$.

FIG. 3B is a diagram schematically showing the effective index modulation structure of the SSFBG 50 shown in FIG. 3A. The horizontal axis is the positional coordinates along the length direction of the optical fiber 56 formed with the SSFBG 50. The vertical axis shows the effective index modulation structure of the optical fiber 56, with a difference exhibited between the maximum and the minimum of the effective index of the core of the optical fiber 56 shown as Δn. Furthermore, a portion of the effective index modulation structure of the core 54 of the optical fiber 56 is depicted enlarged in FIG. 3C.

The effective index modulation period is Λ. Consequently, the Bragg reflection wavelength λ is given by $\lambda=2N_{eff}\Lambda$. Here, $N_{eff}$ is the effective index of the optical fiber 56. Optical pulses that have been input to the SSFBG 50 provided with the 31 individual unit FBG's are time spread into 31 individual chip pulses. The first to the 31$^{st}$ unit FBG's, shown, by $A_1$ to $A_{31}$, arrayed from the left end towards the right end of the SSFBG 50 shown in FIG. 3A and FIG. 3B, have a one-to-one correspondence with the chip pulses output from the SSFBG 50.

As shown in FIG. 3C, a phase shifter $E_i$, in which the effective index is not modulated, is provided between adjacent unit FBG's, namely between an $A_i$ unit FBG shown by $A_i$ and an $A_{i+1}$ unit FBG shown by $A_{i+1}$. The unit FBG length, defined as the length along the length direction of the optical fiber 56 of the $A_i$ unit FBG, namely along the waveguide direction of the optical fiber 56, is shown as a unit diffraction grating length $L_i$. The spacing interval between adjacent unit FBG's, namely the unit segment length defined as the spacing interval of the $A_i$ unit FBG and the $A_{i+1}$ unit FBG, is shown as $D_i$. Namely, $D_i=L_i+E_i$.

When phase shifter $E_i$ is shown, other than the meaning as the identifying reference of the phase shifter, there is also sometimes the meaning as a variable indicating the length of the phase shifter. $E_i$ is used either as the identifying reference or as the variable indicating the length, without particular distinction, within a scope of use that does not generate confusion. This also applies to the unit diffraction grating length $L_i$ and the unit segment length $D_i$.

Explanation is next given regarding the unit segment length $D_i$, defined as the spacing interval between the $A_i$ unit FBG shown by $A_i$ and the $A_{i+1}$ unit FBG shown by $A_{i+1}$, and of how this spacing interval is set. Explanation is of a preferable example in which an SSFBG provided with an optical pulse time spreading device of a preferably exemplary embodiment, is employed in an N-channel optical multiplex signal transmission and reception system, however an SSFBG provided with an optical pulse time spreading device is not generally limited to that of the following explanation.

The unit segment length $D_i$ is defined as the separation distance from the center position in the optical fiber length direction of the $A_i$ unit FBG shown by $A_i$ and the center position in the optical fiber length direction of the $A_{i+1}$ unit FBG shown by $A_{i+1}$.

The $A_i$ unit FBG shown by $A_i$ has a relative phase of $P_i$, and the $A_{i+1}$ unit FBG shown by $A_{i+1}$ has a relative phase of $P_{i+1}$. The phase difference between the two phases $d_i$ is $P_{i+1}-P_i$. If the effective index between the $A_i$ unit FBG shown by $A_i$ and the $A_{i+1}$ unit FBG shown by $A_{i+i}$ (phase shifter $E_i$) is given by $N_{eff}$, then there is the relationship $D_i=\{(M+d_i)\lambda\}/2$. M is a given integer, and if the wavelength of the optical pulse in a vacuum is given by $\lambda_0$ then $\lambda=\lambda_0/N_{eff}$. $(M+d_i)\lambda$ expressed as a phase angle is $2\pi(M+d_i)$.

During manufacture of a first optical pulse time spreading device of the exemplary embodiment, if adjacent i$^{th}$ unit FBG and (i+1)$^{th}$ unit FBG are so disposed with a spacing interval such that the phase difference between the chip pulse generated by reflection at the i$^{th}$ unit FBG, and the chip pulse generated by reflection at the (i+1)$^{th}$ unit FBG, is an integer multiple of $2\pi$, or an odd multiple of $\pi$, then an encoder can be manufactured capable of encoding in a binary digital signal.

The phase difference being an integer multiple of $2\pi$ means that they have the same phase relationship, and can be viewed as a case where the phase difference is 0. Furthermore, the phase difference being an odd number multiple of $\pi$ means that there is an opposite phase relationship, and can be viewed as a case where the phase difference is $\pi$. Namely, encoding a binary digital signal can be realized by disposing the adjacently disposed i$^{th}$ unit FBG and (i+1)$^{th}$ unit FBG such that the phase relationship of the chip pulses generated therefrom is either that of the same phase or the opposite phase $(0, \pi)$.

Furthermore, an optical pulse time spreading device of the OCDM signal generator of an exemplary embodiment can be manufactured if the adjacently disposed i$^{th}$ unit FBG and (i+1)$^{th}$ unit FBG are disposed at a spacing interval such that the phase difference between the chip pulse generated by reflection by the i$^{th}$ unit FBG and the chip pulse generated by reflection by the (i+1)$^{th}$ unit FBG is it $(2M-1)/N$.

OCDM Signal Generator Operation

When explaining the operation of an OCDM signal generator of an exemplary embodiment, an example is explained of a 4-channel multiplex OCDM signal generator, however there is no limitation to the 4-channel multiplexing explained below, and similar contents apply irrespective of the number of channels for multiplexing.

Figure 4:
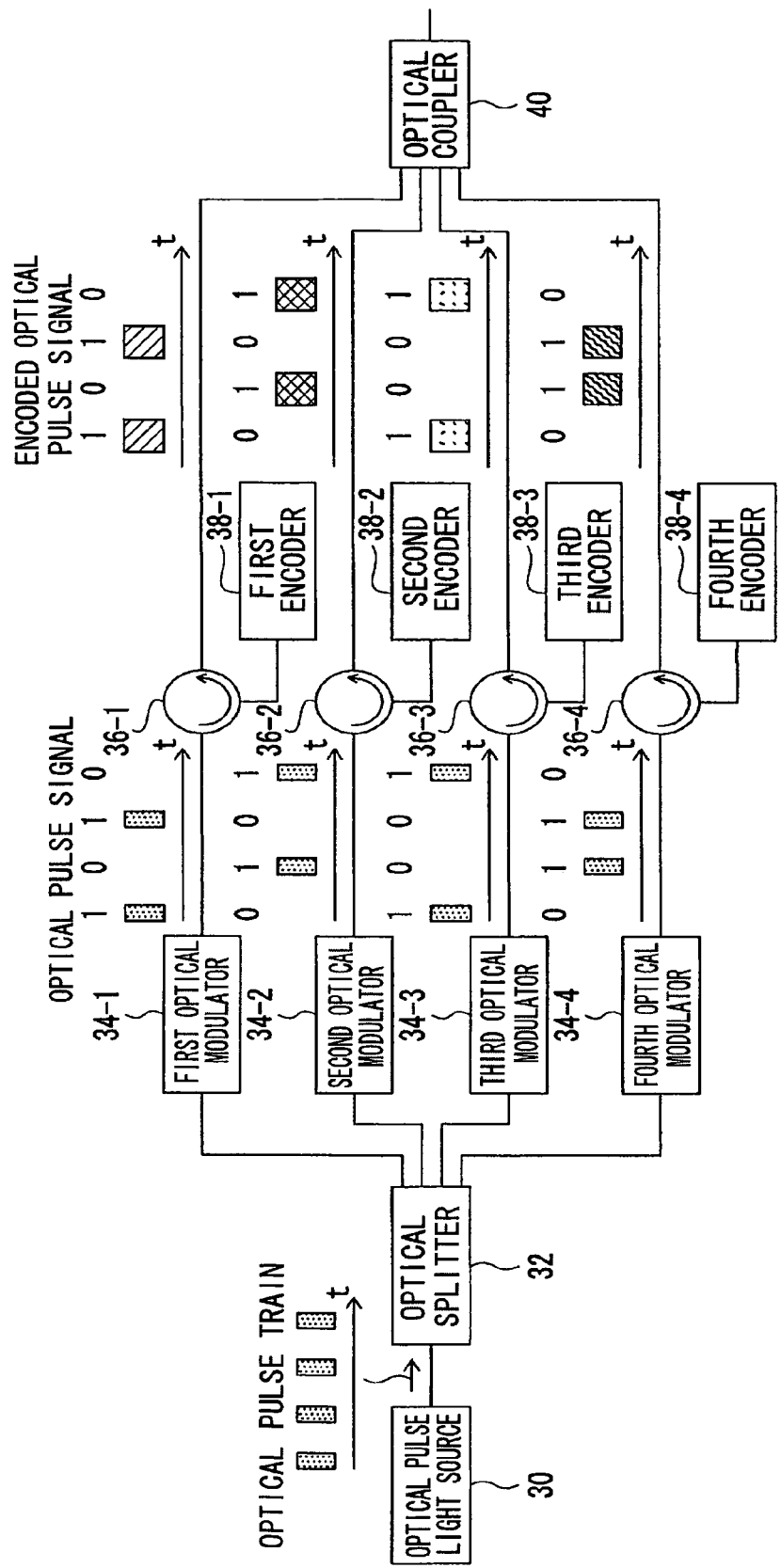
FIG. 4 is a schematic block configuration diagram of a conventional 4-channel multiplex OCDM signal generator.

In order to clarify the difference between the operation of the OCDM signal generator of an exemplary embodiment and the operation of a conventional OCDM signal generator, the configuration and operation of a typical conventional configuration of OCDM signal generator will first be explained, with reference to FIG. 4. FIG. 4 is a schematic block configuration diagram of a conventional 4-channel multiplex OCDM signal generator.

The conventional 4-channel multiplex OCDM signal generator is configured including: an optical pulse light source 30; an optical splitter 32; a first optical modulator 34-1 to a fourth optical modulator 34-4; a first optical circulator 36-1 to a fourth optical circulator 36-4; and a first encoder 38-1 to a fourth encoder 38-4.

An optical pulse train output from the optical pulse light source 30 is input to the optical splitter 32, split into four divisions, and output. The optical pulse train split into four divisions by the optical splitter 32 is input to the first optical modulator 34-1 to the fourth optical modulator 34-4, respectively. The optical pulse train is intensity modulated in the first optical modulator 34-1 to the fourth optical modulator 34-4, and converted into optical pulse signals for output. The optical pulse signals output from the first optical modulator 34-1 to the fourth optical modulator 34-4 are input respectively to the first encoder 38-1 to the fourth encoder 38-4 via the first optical circulator 36-1 to the fourth optical circulator 36-4.

In the first encoder 38-1 to the fourth encoder 38-4, the optical pulse signals respectively input from the first optical modulator 34-1 to the fourth optical modulator 34-4 are encoded, converted into encoded optical pulse signals, and output. The encoded optical pulse signal output from the first encoder 38-1 to the fourth encoder 38-4 is input, via the respective first optical circulator 36-1 to the fourth optical circulator 36-4, to the optical coupler 40, and multiplexed, generating an OCDM signal, which is then output.

In FIG. 4, the time waveform of the optical pulse train output from the optical pulse light source 30, the time waveform of the optical pulse signal output from the respective first optical modulator 34-1 to the fourth optical modulator 34-4, and the time waveform of the encoded optical pulse signals generated in the first encoder 38-1 to the fourth encoder 38-4 and output via the respective first optical circulator 36-1 to the fourth optical circulator 36-4, are shown along their respective transmission paths.

These optical pulse trains, the time waveforms of the optical pulse signal and the encoded optical pulse signal shown in the drawing, schematically show the configuring optical pulses or chip pulses as rectangular shapes applied with hatching patterns. The optical pulses configuring the optical pulse signal input to the first encoder 38-1 to the fourth encoder 38-4 are converted into a chip pulse train by the respective first encoder 38-1 to the fourth encoder 38-4. One optical pulse is arranged on the time axis along a length proportional to the length of code, to give a chip pulse train. In FIG. 4, one optical pulse worth being converted into a chip pulse train is shown schematically by the rectangle of which the horizontal length is longer than that of the rectangle representing the optical pulse.

In FIG. 4, a representation is depicted of optical pulse signals of RZ format of (0101), (1010), (1001) and (0110) being respectively output from the first optical modulator 34-1 to the fourth optical modulator 34-4. Taking the optical pulse signal output from the first optical modulator 34-1 as an example, optical pulse is present in the time slots shown as "1", and optical pulse is not present in the time slots shown as "0". The optical pulses configuring this optical pulse signal is encoded by the first encoder 38-1 and forms a single string of a chip pulse train. This string of a chip pulse train is shown taking a longer length of edge along the time axis direction in FIG. 4 than that of the rectangles representing the optical pulse.

Since the codes set in the respective first encoder 38-1 to the fourth encoder 38-4 are different from each other, the chip pulse trains arising as a result of encoding the optical pulse in the respective encoders are of different respective placement arrangements on the time axis. In FIG. 4, the chip pulse trains configuring the encoded optical pulse signal output from the first encoder 38-1 to the fourth encoder 38-4 are shown as rectangular shapes with different patterns applied thereto.

In the conventional 4-channel multiplex OCDM signal generator shown in FIG. 4, energy loss in the optical carrier wave of the optical pulse train occurs at the stage of splitting the optical pulse train into four divisions by the optical splitter 32. Furthermore, from the energy in the optical carrier wave of the optical pulse signal input to the first encoder 38-1 to the fourth encoder 38-4, only the component of the encoded optical pulse signal output by Bragg reflection is effectively used, and the energy component of the encoded optical pulse signal that passes through the SSFBG configuring the first encoder 38-1 to the fourth encoder 38-4 is discarded, and is not usefully employed in order to generate an encoded optical pulse signal.

Consequently, in the 4-channel multiplex OCDM signal output from the conventional 4-channel multiplex OCDM signal generator, only a portion of the energy of the optical carrier wave of the optical pulse train input to the optical splitter 32 is used, and the greater part thereof is wasted.

Figure 5:
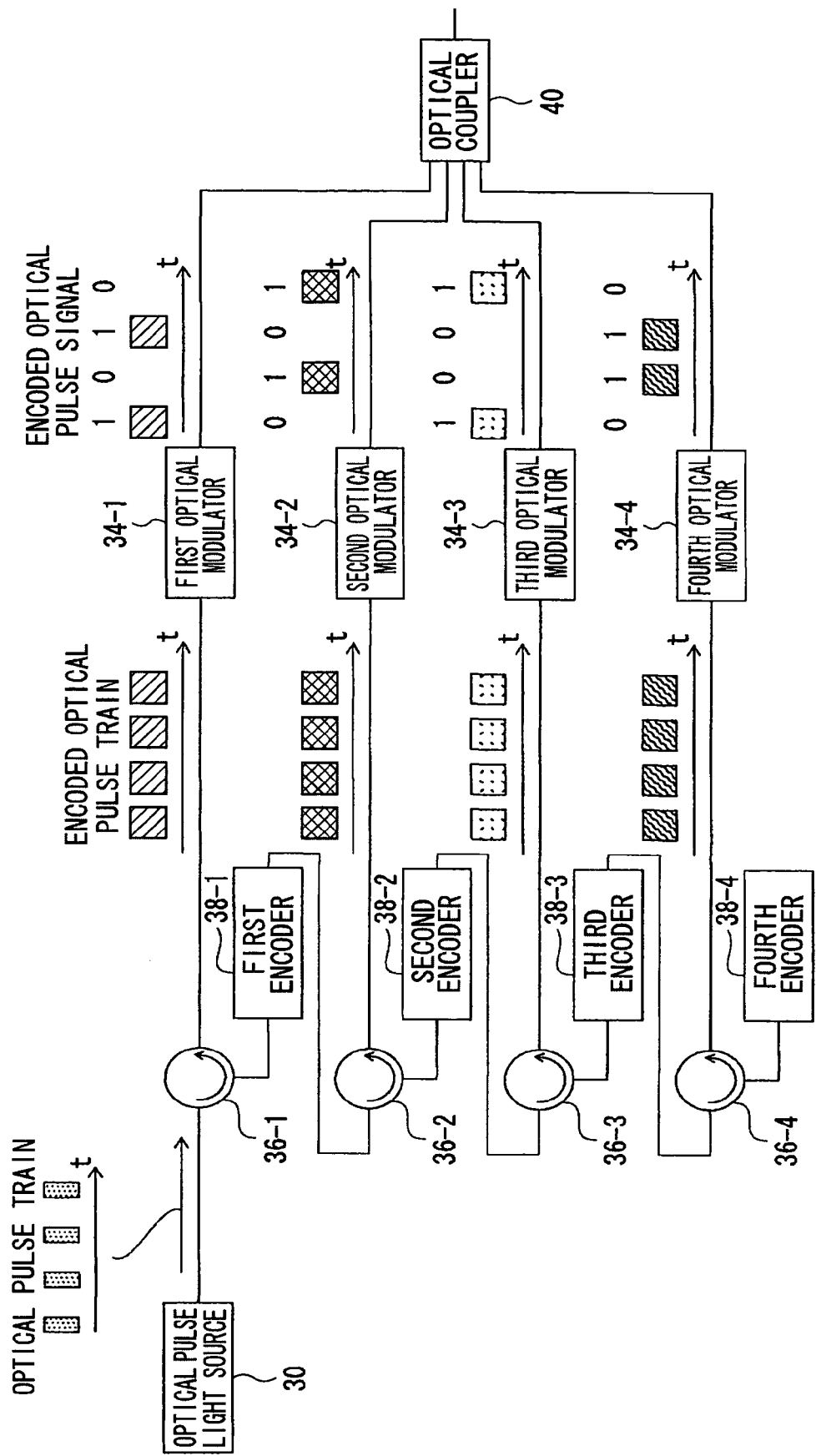
FIG. 5 is a schematic block configuration diagram of a 4-channel multiplex OCDM signal generator of an exemplary embodiment.

Explanation follows of the configuration and operation of the OCDM signal generator of the present exemplary embodiment, with reference to FIG. 5. FIG. 5 is a schematic block configuration diagram of a 4-channel multiplex OCDM signal generator of an exemplary embodiment.

The 4-channel multiplex OCDM signal generator of an exemplary embodiment is configured including: an optical pulse light source 30; a first optical circulator 36-1 to a fourth optical circulator 36-4; a first optical modulator 34-1 to a fourth optical modulator 34-4; and a first encoder 38-1 to a fourth encoder 38-4.

The optical pulse train output from the optical pulse light source 30 is input to the first encoder 38-1 via the first optical circulator 36-1, a first encoded optical pulse train output by Bragg reflection from the first encoder 38-1 is input to the first optical modulator 34-1, once again via the first optical circulator 36-1. The first encoded optical pulse train input to the first optical modulator 34-1 is output as a first encoded optical pulse signal, this being an encoded optical pulse signal.

The first optical pulse train that has passed through the first encoder 38-1 is input to the second encoder 38-2 via the second optical circulator 36-2, and the second encoded optical pulse train output by Bragg reflection from the second encoder 38-2 is input to the second optical modulator 34-2, once again via the second optical circulator 36-2. The second encoded optical pulse train input to the second optical modulator 34-2 is output as a second encoded optical pulse signal, this being an encoded optical pulse signal.

The second optical pulse train that has passed through the second encoder 38-2 is input to the third encoder 38-3 via the third optical circulator 36-3, and the third encoded optical pulse train output by Bragg reflection from the third encoder 38-3 is input to the third optical modulator 34-3, once again via the third optical circulator 36-3. The third encoded optical pulse train input to the third optical modulator 34-3 is output as a third encoded optical pulse signal, this being an encoded optical pulse signal.

The third optical pulse train that has passed through the third encoder 38-3 is input to the fourth encoder 38-4 via the fourth optical circulator 36-4, and the fourth encoded optical pulse train output by Bragg reflection from the fourth encoder 38-4 is input to the fourth optical modulator 34-4, once again via the fourth optical circulator 36-4. The fourth encoded optical pulse train input to the fourth optical modulator 34-4 is output as a third encoded optical pulse signal, this being an encoded optical pulse signal.

The first to the fourth encoded optical pulse signals output respectively from the first optical modulator 34-1 to the fourth optical modulator 34-4 are input to the optical coupler 40, multiplexed to generate an OCDM signal, and output.

In FIG. 5 too, as in FIG. 4, the time waveform of the optical pulse train output from the optical pulse light source 30, the time waveforms of the optical pulse signals output from the respective first optical modulator 34-1 to the fourth optical modulator 34-4, and the time waveform of the encoded optical pulse trains generated in the first encoder 38-1 to the fourth encoder 38-4 and output via the respective first optical circulator 36-1 to the fourth optical circulator 36-4, are shown along their respective transmission paths.

As shown in FIG. 5, in the OCDM signal generator of an exemplary embodiment, configuration is made in which the optical pulse trains are encoded by the encoders, generating encoded optical pulse trains, and the encoded optical pulse train are intensity modulated by the optical modulators to generate encoded optical pulse signals. In comparison thereto, in the configuration OCDM signal generator shown in FIG. 4, configuration is made in which the optical pulse trains are intensity modulated by the optical modulators to generate optical pulse signals, and these optical pulse signals are encoded by the encoders, generating encoded optical pulse signals. As described above, whether optical pulse trains are converted into optical pulse signals and these optical pulse signals are encoded by the encoders to generate encoded optical pulse signals, or whether optical pulse trains are encoded by the encoders generating encoded optical pulse trains and these encoded optical pulse trains are intensity modulated by the optical modulators generating encoded optical pulse signals, the encoded optical pulse signals generated are the same. Whether the process to generate an optical pulse signal is performed first, or the process to code is performed first, is a matter of design.

According to the OCDM signal generator of an exemplary embodiment shown in FIG. 5, the optical splitter 32 necessary in a conventional OCDM signal generator is not required. Furthermore, from the energy of the optical carrier waves of the optical pulse trains input to the first encoder 38-1 to the third encoder 38-3, the encoded optical pulse signal output by Bragg reflection is effectively used, and also the optical pulse trains that pass through the encoders are all input to the encoders disposed at the following stage.

Consequently, the 4-channel multiplex OCDM signal output from the 4-channel multiplex OCDM signal generator of an exemplary embodiment effectively uses nearly all of the energy of the optical carrier wave of the input optical pulse trains, and there is nearly no optical carrier wave component that is lost.

Optical Carrier Wave Energy Loss Evaluation

Evaluation follows, with reference to FIG. 4 and FIG. 5, of the optical carrier wave power in the optical modulator(s), the encoders, and the like, taking the output power of the optical pulse train output from the optical pulse light source 30 as 0 dBm (1 mW). The OCDM signal intensity output from the OCDM signal generator of an exemplary embodiment is thereby shown to be sufficiently high, in comparison to the OCDM signal intensity output from the conventional OCDM signal generator.

In the conventional OCDM signal generator shown in FIG. 4, due the optical pulse train output from the optical pulse light source 30 being split into four divisions by the optical splitter 32, the intensity of the optical pulse train input to each of the respective first optical modulator 34-1 to the fourth optical modulator 34-4 is ¼ the intensity of the optical pulse train output from the optical pulse light source 30, −6 dBm.

Given an energy loss in the optical carrier wave of 3 dB in each of the optical modulators of the first optical modulator 34-1 to the fourth optical modulator 34-4, the energy loss component of the optical carrier wave passing through the first encoder 38-1 to the fourth encoder 38-4 adds up to a total of 22.8 dB, so the energy of each of the optical carrier waves of the first to the fourth optical pulse signals input to the optical coupler 40 is reduced by (6 dB+3 dB+22.8 dB) from 0 dBm, to become −31.8 dBm.

However, in the OCDM signal generator of an exemplary embodiment shown in FIG. 5, the energy loss of the optical carrier wave in the optical splitter 32 does not occur. Consequently, just the 3 dB energy loss component of the optical carrier wave in each of the optical modulators of the first optical modulator 34-1 to the fourth optical modulator 34-4, and the 22.8 dB equivalent to the energy loss component of the optical carrier wave passing through the first encoder 38-1 to the fourth encoder 38-4, need to be considered.

The energy of the optical carrier wave of the first encoded optical pulse signal output from the first optical modulator 34-1 and input to the optical coupler 40 is reduced from 0 dBm by (3 dB+22.8 dB), to become −25.8 dBm. The energy of the optical carrier wave of the second encoded optical pulse signal output from the second optical modulator 34-2 and input to the optical coupler 40 is weaker by 0.02 dB than the energy of the optical carrier wave of the optical pulse train input to the first optical modulator 34-1. However, the second encoded optical pulse train is generated from the light spectral band (the wavelength band including the central wavelength) in which this energy loss is generated. Therefore, the second encoded optical pulse signal output from the second optical modulator 34-2 has a loss amount that is greater by 0.04 dB than the optical carrier wave of the above first encoded optical pulse signal. Consequently, the energy of the optical carrier wave of the second encoded optical pulse signal input to the optical coupler 40 is reduced the 0 dBm by (0.02+0.04+3 dB+22.8 dB), to become −25.86 dBm.

Similarly, in the third encoder 38-3 and the fourth encoder 38-4 too, due to the pass-through loss of the second encoder 38-2 and the third encoder 38-3, the energy of the optical carrier waves are each reduced by 0.02 dB, respectively. Furthermore, since the energy loss also occurs in the vicinity of the central wavelength of the wavelength spectra of the optical pulse trains that have passed through the second encoder 38-2 and the third encoder 38-3, respectively, the reflection loss in the third encoder 38-3 and the fourth encoder 38-4 are each increased by 0.10 dB and 0.17 dB, respectively. Consequently, the energy of the optical carrier waves of the third encoded optical pulse signal and the fourth encoded optical pulse signal input to the optical coupler 40 become −25.94 dBm and −26.03 dBm, respectively.

As explained above, in the 4-channel multiplex OCDM signal generator of an exemplary embodiment, even though there is a difference of about 0.2 dB in the energy of the optical carrier wave of the first to the fourth encoded optical pulse signals input to the optical coupler 40, it can be seen that the energy of the optical carrier wave of the encoded optical pulse signal of each of the channels is a value that is about 6 dB higher than the −31.8 dBm energy intensity of the optical carrier wave of the first to the fourth encoded optical pulse signals in the configuration 4-channel multiplex OCDM signal generator.

Explanation follows, with reference to FIG. 6A to 6D, regarding the wavelength spectrum of the optical pulse train input to the first encoder 38-1, the wavelength spectrum of the optical pulse train passing through the first encoder 38-1, and the wavelength spectrum of the optical pulse trains passing through the second encoder 38-2 and the wavelength spectrum of the optical pulse trains passing through the third encoder 38-3.

Figure 6A:
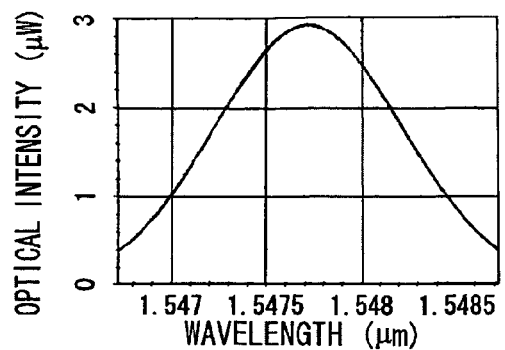
FIG. 6A to FIG. 6D are diagrams to accompany explanation regarding the wavelength spectra of optical pulse trains.
Figure 6B:
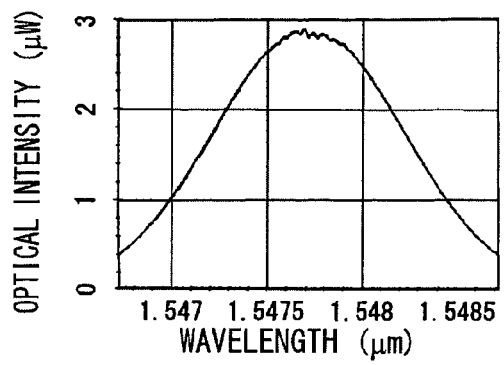
Figure 6C:
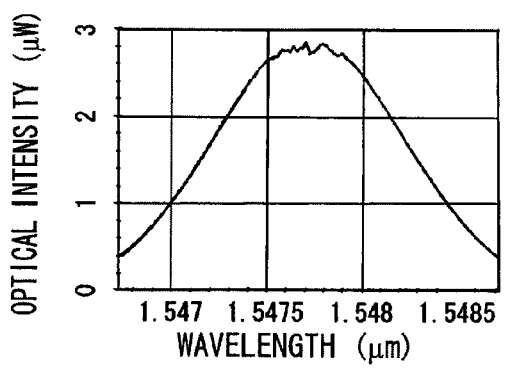
Figure 6D:
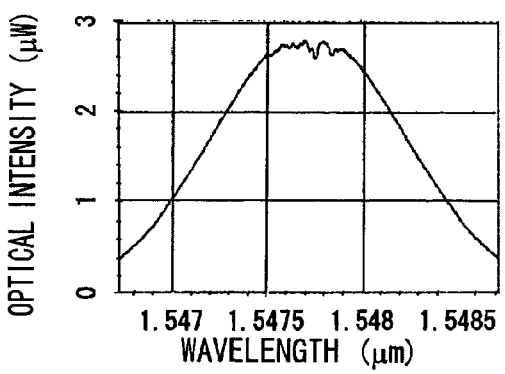

FIG. 6A to FIG. 6D are diagrams to accompany explanation regarding the wavelength spectra of optical pulse trains. FIG. 6A is a diagram showing the wavelength spectra of the optical pulse train input to the first encoder 38-1, FIG. 6B is a diagram showing the wavelength spectra of the optical pulse train passing through first encoder 38-1, FIG. 6C is a diagram showing the wavelength spectra of the optical pulse train passing through the second encoder 38-2, and FIG. 6D is a diagram showing the wavelength spectra of the optical pulse train passing through the third encoder 38-3. In each of FIG. 6A to FIG. 6D, the horizontal axis shows wavelength in a unit scale of μm, and the vertical axis shows optical intensity in a unit scale of μW.

It can be seen that there is loss in the spectral component of the wavelength band, including the central wavelength, passing in sequence through the first encoder 38-1, the second encoder 38-2, and the third encoder 38-3. Therefore, as described above, the energy of the optical carrier wave of the first optical pulse train is weaker by 0.02 dB than the energy of the optical carrier wave of the optical pulse train input to the first encoder 38-1. However, since the second encoded optical pulse train is generated from the light spectral band (wavelength band including the central wavelength) in which the energy loss occurs, a phenomenon occurs in which the loss amount of the second encoded optical pulse signal output from the second optical modulator 34-2 is greater by 0.04 dB than the loss amount of the optical carrier wave of the above first encoded optical pulse signal.

As described above, it can be seen that for a 4-channel multiplex OCDM signal generator, in comparison of a conventional device with the device of an exemplary embodiment, the energy in the optical carrier wave of the encoded optical pulse signal of each of the channels is a value about 6 dB higher in an exemplary embodiment, however the value of this improvement (referred to below as the advantage) depends on the number of channels multiplexed.

Figure 7:
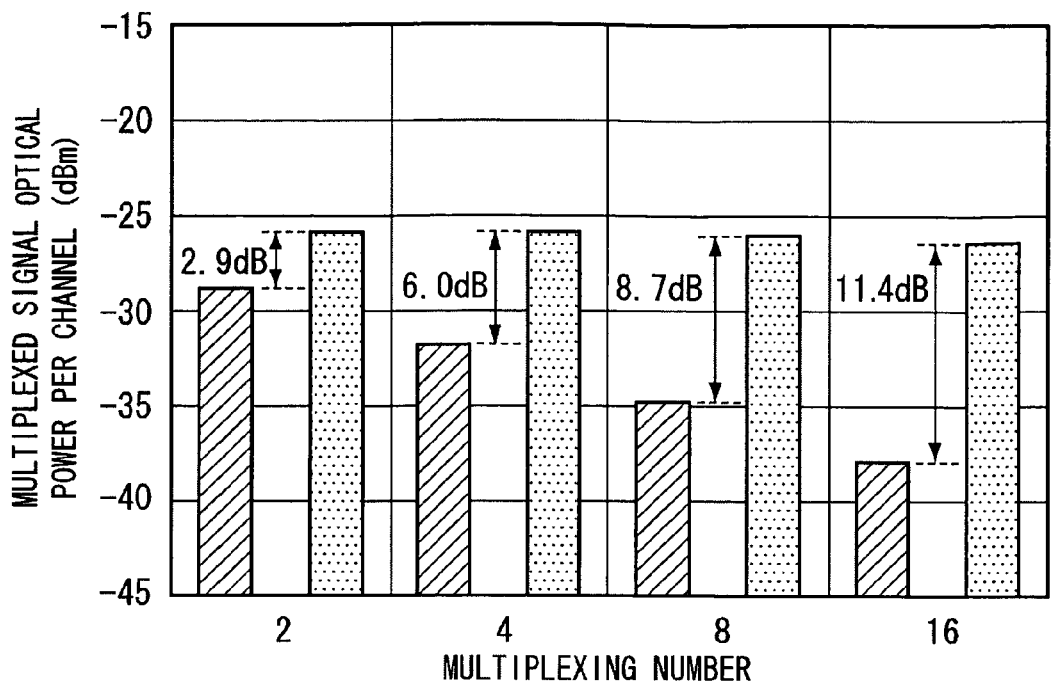
FIG. 7 is a diagram accompanying explanation regarding the advantage against the number of channels multiplexed.

Explanation follows, with reference to FIG. 7, regarding what short of advantage can be obtained against the number of channels multiplexed. FIG. 7 is a diagram accompanying explanation regarding the advantage against the number of channels multiplexed. In FIG. 7, the vertical axis shows the energy of the optical carrier wave of the encoded optical pulse signal per channel on a scale of units of dBm. In FIG. 7, the horizontal axis shows the encoded optical pulse signals as a bar-chart, for cases of 2-, 4-, 8-, and 16-fold multiplexing, with the left hand side showing a case where a conventional OCDM signal generator is employed, and the right hand side showing a case where the OCDM signal generator of an exemplary embodiment is employed.

It can be seen that advantages are obtained of 2.9 dB for two-fold multiplexing, 6.0 dB for four-fold multiplexing, 8.7 dB for eight-fold multiplexing, and 11.4 dB for sixteen-fold multiplexing. Namely, it can be seen that the effect of the present invention becomes more significant as the number of channels multiplexed increases.

According to the four-fold multiplexing OCDM signal generator of an exemplary embodiment, even if the Bragg reflectivity of each of the encoders (first encoder 38-1 to the fourth encoder 38-4) of each of the channels is made high, it is possible to make the intensity of the encoded optical pulse signal input to the optical coupler 40 higher, in comparison to when employing the conventional OCDM signal generator.

Figure 8:
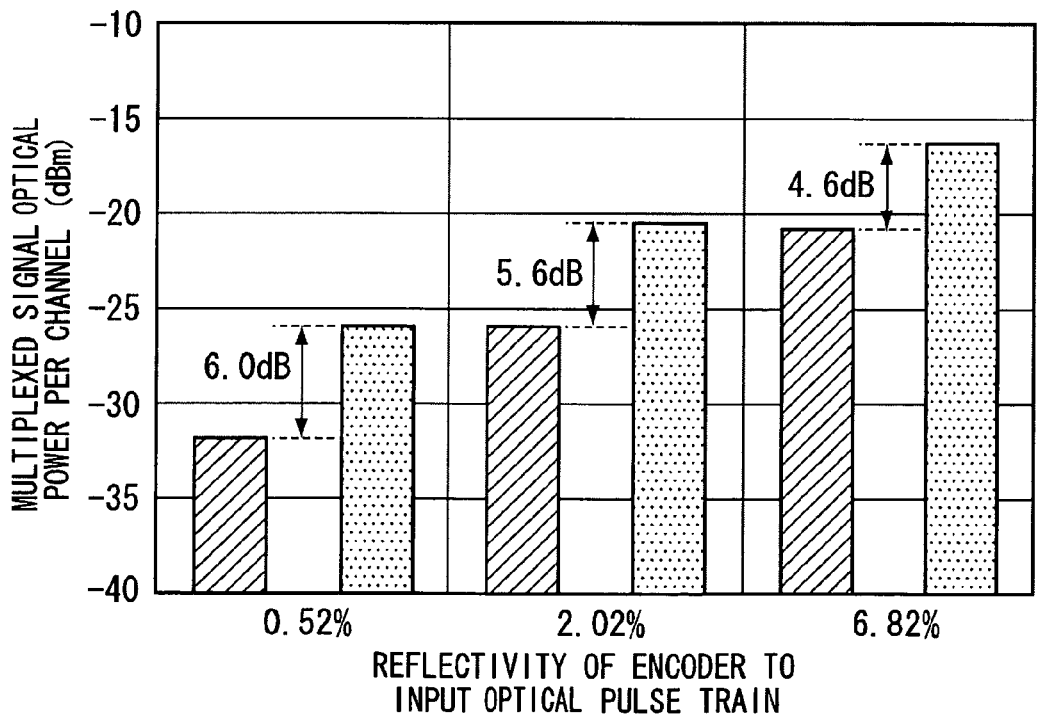
FIG. 8 is a diagram showing the advantage against the Bragg reflectivity of the encoder of each channel.

Explanation follows, with reference to FIG. 8, regarding the degree of advantage that can be obtained, in comparison to employing a conventional OCDM signal generator, in cases where the Bragg reflectivity of the encoder of each channel is 0.52%, 2.02%, and 6.82% using the example of four-fold multiplexing. FIG. 8 is a diagram showing the advantage against the Bragg reflectivity of the encoder of each channel.

In FIG. 8, the vertical axis shows the energy of the optical carrier wave of the encoded optical pulse signal per channel, on a scale of units of dBm. In FIG. 8, the horizontal axis shows a bar-chart of the encoded optical pulse signals per channel for cases of Bragg reflectivity of each channel of 0.52%, 2.02%, and 6.82%, with the left hand side a case where a configuration OCDM signal generator is employed and the right hand side a case where the OCDM signal generator of an exemplary embodiment is employed.

As shown in FIG. 8, when the Bragg reflectivity of the encoder of each channel is 0.52%, 2.02%, and 6.82%, advantages of 6.0 dB, 5.6 dB, and 4.6 dB, respectively, are obtained. It can be seen that, according to the four-fold OCDM signal generator of an exemplary embodiment, a high advantage of 4.6 dB is obtained even if the Bragg reflectivity of the encoder of each channel is raised as high as 6.82%.

Effect Due to the Type of Code for Setting the Encoders

In the OCDM signal generator of an exemplary embodiment, the optical pulse train input to the encoder disposed at a following stage is the optical pulse train that has passed through the encoder of the previous stage. In general terms, the $(k-1)^{th}$ optical pulse train that has passed through the $(k-1)^{th}$ encoder suffers loss of the spectral components reflected by Bragg reflection in the first to the $(k-1)^{th}$ encoders.

However, by selecting the type of code set in the first to the $k^{th}$ encoders, it is possible to make the frequency of the spectral component passing through the $(k-1)^{th}$ encoder, input to the $k^{th}$ encoder, and lost by encoding in the $k^{th}$ encoder, different from the frequency of the spectral component lost of the optical pulse train passing through and output from the $(k-1)^{th}$ encoder. By selecting the code set in the first to the $k^{th}$ encoders in this manner, it is possible for the encoding processing in the previous stage encoder not to influence the encoding processing of the following stage encoder.

The following codes can be employed in setting as a code satisfying such conditions. The adjacent $i^{th}$ unit FBG and $(i+1)^{th}$ unit FBG, configuring the SSFBG provided with M encoders, are disposed at spacing intervals to give a phase difference of $\pi(2M-1)/N$ between the chip pulse generated by reflection at the $i^{th}$ unit FBG and the chip pulse generated by reflection at the $(i+1)^{th}$ unit FBG.

Codes set in the SSFBG of such a configuration are different from the normal meaning of codes (code as narrowly defined). However, as already chosen, the meaning here is broader than the traditionally used conventional meaning, however since it falls within the definition of a rule for unambiguously determining the time spreading rule such that the phase difference is $\pi(2M-1)/N$ between adjacent chip pulses, it is referred to as a code.

In order to disposed the $i^{th}$ unit FBG and the $(i+1)^{th}$ unit FBG such that the phase difference is $\pi(2M-1)/N$ between adjacent chip pulses, the unit segment length $D_i$, defined as the spacing interval between the $i^{th}$ unit FBG and the $(i+1)^{th}$ unit FBG, may be set according to the following Equation (1).

Namely, since $d_i = \pi(2M-1)/n = (\lambda/2)(2M-1)$,
the $i^{th}$ unit FBG and the $(i+1)^{th}$ unit FBG may be disposed such that $$D_i = \{(M\lambda + (\lambda/2)(2M-1)/N)\}/2 \tag{1}$$

Figure 9A:
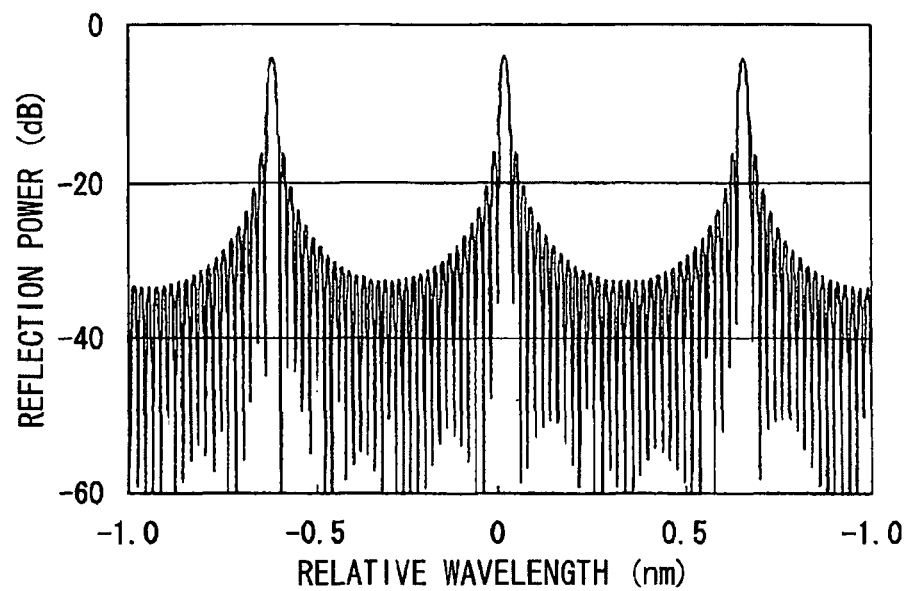
FIG. 9A and FIG. 9B are diagrams to accompany explanation of the wavelength spectra of chip pulses generated by two types of encoder set with different codes.
Figure 9B:
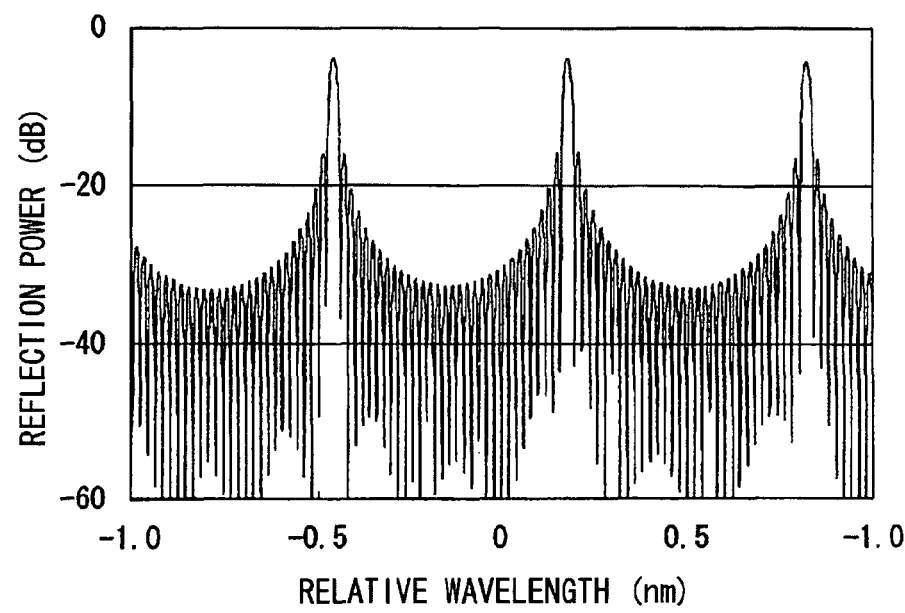

Explanation follows, with reference to FIG. 9A and FIG. 9B, of the difference of wavelength spectra of chip pulse trains generated by two types of encoder set with different codes. FIG. 9A and FIG. 9B are diagrams to accompany explanation of the wavelength spectra of chip pulse trains generated by two types of encoder set with different codes. FIG. 9A shows the wavelength spectra of chip pulses output from an encoder in which a code (code A) is set defining a rule that imparts a phase difference of $\pi/4$ (N=4, M=1) between adjacent chip pulses. FIG. 9B shows the wavelength spectra of chip pulses output from an encoder in which a code (code B) is set defining a rule that imparts a phase difference of $3\pi/4$ (N=4, M=2) between adjacent chip pulses.

In each of FIG. 9A and FIG. 9B, the vertical axis shows the reflected power of the chip pulse train output from the encoder relative to the input optical pulse, on a scale of units of dB. The horizontal axis therein shows the relative wavelength from the Bragg wavelength, with reference to the wavelength in the vicinity of the central wavelength of Bragg reflection of the unit FBG's configuring the encoder (0 nm). In FIG. 9A and FIG. 9B, three main peaks appear, and the spacing interval of adjacent unit FBG's configuring the encoder is determined according to the peak positions. The code A and the code B have different phase differences between adjacent chip pulses, namely, due to the spacing interval of adjacent unit FBG's configuring the encoders being different, the main peak positions are also different.

The reason that plural main peaks appear in FIG. 9A and FIG. 9B is as follows. The encoders defined by code A or by code B are configured with plural periodically disposed unit FBG's, and the disposed spacing interval of the unit FBG's differ. The unit FBG's can be viewed as approximating to the role of acting as semi-transparent mirrors. Namely, the encoders here can be thought of as a type of wavelength filter configured by periodically disposed reflecting structures, and can be easily understood by analogy to a Fabry-Perot etalon configured by two sheets of semi-transparent mirrors disposed at spacing intervals equivalent to the disposed spacing intervals of the unit FBG's.

The vertical mode spectrum of a Fabry-Perot etalon is equivalent to the reflection spectra of the encoders shown in FIG. 9A and FIG. 9B. Namely, the main peaks of the wavelength spectra shown in FIG. 9A and FIG. 9B correspond to the vertical modes of a Fabry-Perot etalon. The spacing interval of the refection faces of the Fabry-Perot etalon is equivalent to the disposed spacing interval of the unit FBG's of the encoders of an exemplary embodiment.

Consequently, if the Bragg wavelength of the unit FBG's is set within the wavelength spectral band of the input optical pulse, the encoder configured by the unit FBG's disposed at even spacing intervals has a defined relationship of reflection or transmission spectra, and can be thought of having the same action as a Fabry-Perot etalon.

Explanation follows of the effect obtained by the OCDM signal generator configured with the first to $M^{th}$ encoders set with codes that impart conditions such that the phase difference is $\pi(2M-1)/N$ between adjacent chip pulses. Namely, the frequency of the spectral component passing through the $(k-1)^{th}$ encoder, input to the $k^{th}$ encoder, and lost by encoding in the $k^{th}$ encoder, is different from the frequency of the spectral component lost due to encoding in the $(k-1)^{th}$ encoder. Therefore, explanation follows, with reference to FIG. 10A to FIG. 10F, regarding an effect obtained in which encoding processing in the previous stage encoder does not affect the encoding processing in the following stage encoder.

Figure 10C:
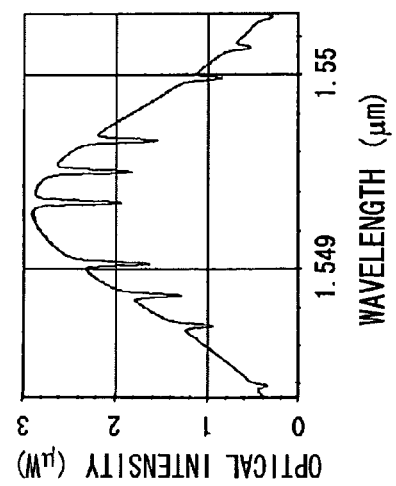
FIG. 10A to FIG. 10F are diagrams to accompany explanation regarding an effect by which encoding processing in the previous stage encoder does not affect the encoding processing in the following stage encoder.
Figure 10B:
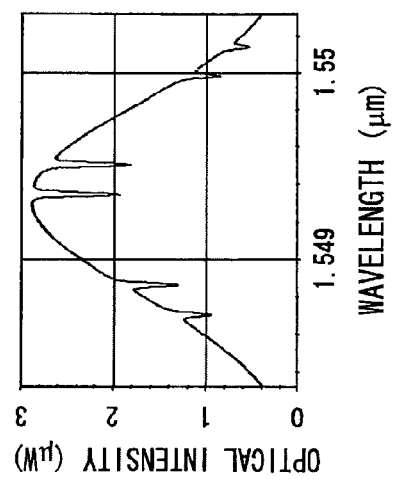
Figure 10A:
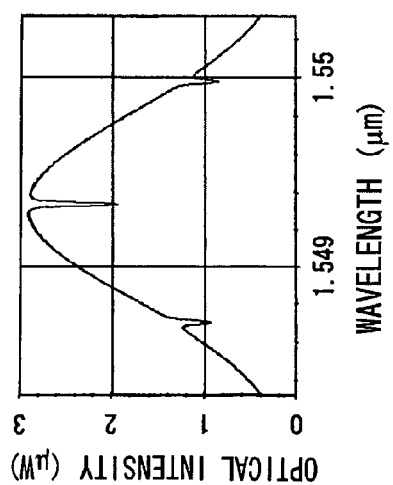
Figure 10F:
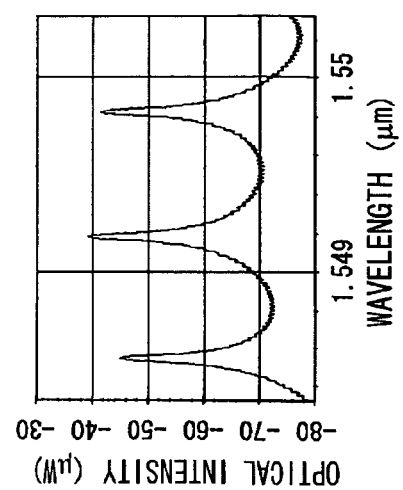
Figure 10E:
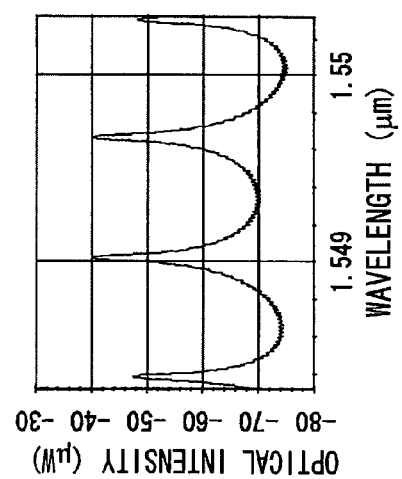
Figure 10D:
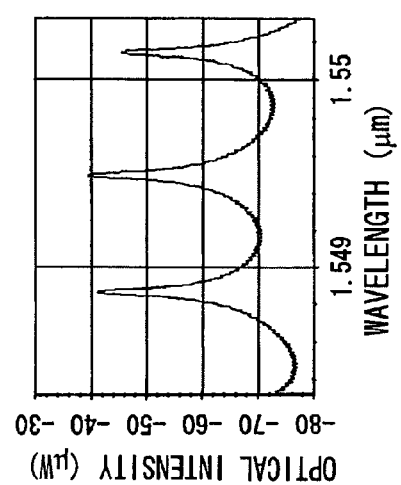

FIG. 10A to FIG. 10F are diagrams to accompany explanation regarding an effect in which encoding processing in the previous stage encoder does not affect the encoding processing in the following stage encoder. FIG. 10A is a diagram of the wavelength spectrum of the optical pulse train passing through the first encoder, FIG. 10B is a diagram of the wavelength spectrum of the optical pulse train passing through the second encoder, and FIG. 10C is a diagram of the wavelength spectrum of the optical pulse train passing through the third encoder. FIG. 10D is a diagram of the wavelength spectrum of the encoded optical pulse train output by Bragg reflection from the second encoder, FIG. 10E is a diagram of the wavelength spectrum of the encoded optical pulse train output by Bragg reflection from the third encoder, FIG. 10F is a diagram of the wavelength spectrum of the encoded optical pulse train output by Bragg reflection from the third encoder, and FIG. 10F is a diagram of the wavelength spectrum of the encoded optical pulse train output by Bragg reflection from the fourth encoder.

By comparing FIG. 10A, FIG. 10B and FIG. 10C, it can be seen that the wavelength spectra of optical pulse trains passing through from the first, second and third encoders have different respective absorption wavelength peak positions. Furthermore, by comparing FIG. 10D, FIG. 10E and FIG. 10F, it can be seen that the wavelength spectra of encoded optical pulse trains output by Bragg reflection from the second, third and fourth encoders have different reflection wavelength peak positions, respectively.

Namely, as shown in FIG. 10A to FIG. 10F, the first optical pulse train passing through the first encoder suffers a loss of a portion of the frequency spectral component due to encoding in the first encoder. However, on passing through the first encoder and being input to the second encoder, the lost frequency spectral component due to encoding in the second encoder is a different frequency spectral component to that lost due to encoding in the first encoder as described above. Consequently, the encoding processing in the previous stage encoder does not affect the encoding processing in the following stage encoder. The relationship between the second encoder and the third encoder is similar.

Consequently, in general terms, $(k-1)^{th}$ optical pulse train that has passed through the $(k-1)^{th}$ encoder suffers a loss of a portion of the frequency spectral component due to encoding in the $(k-1)^{th}$ encoder. However, on passing through the $(k-1)^{th}$ encoder and being input to the $k^{th}$ encoder, the lost frequency spectral component due to encoding in the $k^{th}$ encoder is a different frequency spectral component to that lost due to encoding in the $(k-1)^{th}$ encoder as described above. Consequently, the encoding processing in the previous stage encoder does not affect the encoding processing in the following stage encoder.

Figure 11:
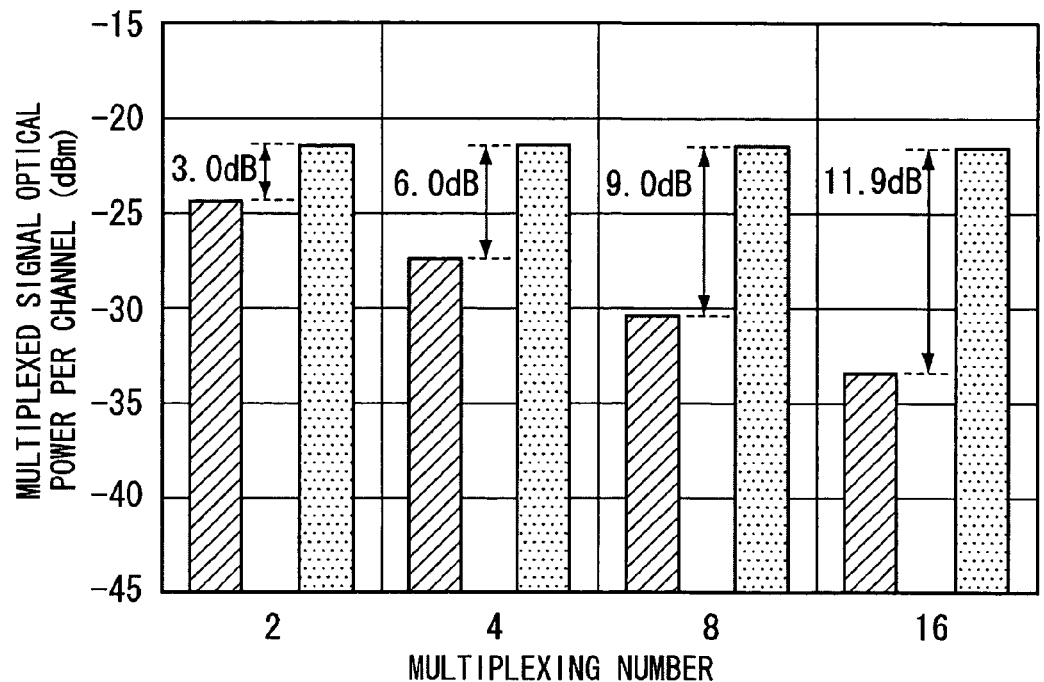
FIG. 11 is a diagram accompanying explanation regarding the advantage against the number of channels multiplexed, in a four-fold multiplexed OCDM signal generator of an exemplary embodiment configured employing codes determined by the time spreading rule that imparts a condition of a phase difference of $\pi(2M-1)/N$ between adjacent chip pulses.

Explanation follows, with reference to FIG. 11, regarding the degree of advantage that can be obtained against the number of channels multiplexed, in a four-fold multiplexed OCDM signal generator of an exemplary embodiment configured employing codes for defining a time spreading rule that imparts the condition of a phase difference of $\pi(2M-1)/N$ between adjacent chip pulses as described above. FIG. 11 is a diagram accompanying explanation of the degree of advantage that can be obtained against the number of channels multiplexed, in a four-fold multiplexed OCDM signal generator of an exemplary embodiment configured employing codes defining a time spreading rule that imparts the condition of a phase difference of $\pi(2M-1)/N$ between adjacent chip pulses. In FIG. 11, the vertical axis shows the energy of the optical carrier wave of the encoded optical pulse signals per channel on a scale of units of dBm. In FIG. 11, the horizontal axis shows the encoded optical pulse signals per channel in a bar-chart, for cases of 2-, 4-, 8-, and 16-fold multiplexing, with the left hand side showing a case where a conventional OCDM signal generator is employed, and the right hand side showing a case where the OCDM signal generator of an exemplary embodiment is employed.

It can be seen that advantages are obtained of 3.0 dB for two-fold multiplexing, 6.0 dB for four-fold multiplexing, 9.0 dB for eight-fold multiplexing, and 11.9 dB for sixteen-fold multiplexing. Namely, it can be seen that the effect of the present invention becomes more significant as the number of channels multiplexed increases.

In the four-fold multiplexing OCDM signal generator of an exemplary embodiment, when configured using a code determining the time spreading rule to impart conditions of a phase difference of $\pi(2M-1)/N$ between adjacent chip pulses, as explained with reference to FIG. 7 above, even if the Bragg reflectivity of the encoders (first encoder 38-1 to the fourth encoder 38-4) for each of the channels is made high, it is possible to make the intensity of the encoded optical pulse signal input to the optical coupler 40 high, in comparison to when employing the conventional OCDM signal generator.

Figure 12:
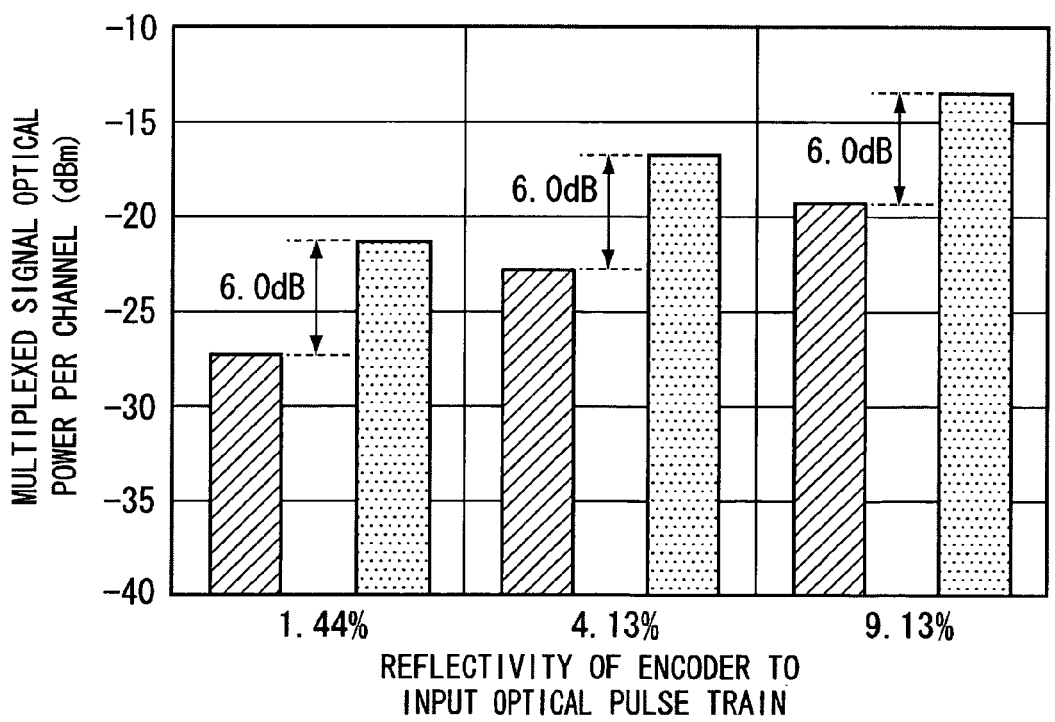
FIG. 12 is a diagram showing the advantage against the Bragg reflectivity of the encoder of each channel in a four-fold multiplexing OCDM signal generator of an exemplary embodiment configured employing a code determined by the time spreading rule to impart conditions of a phase difference of $\pi(2M-1)/N$ between adjacent chip pulses.

Explanation follows, with reference to FIG. 12, regarding the degree of advantage that can be obtained in comparison to employing a conventional OCDM signal generator, when the Bragg reflectivity of the encoder of each channel is 1.44%, 4.13%, and 9.13% using the example of a four-fold multiplexing OCDM signal generator of an exemplary embodiment configured employing a code determining the time spreading rule to impart conditions of a phase difference of $\pi(2M-1)/N$ between adjacent chip pulses. FIG. 12 is a diagram showing the advantage against the Bragg reflectivity of the encoder of each channel in the four-fold multiplexing OCDM signal generator of an exemplary embodiment configured employing a code determining the time spreading rule to impart conditions of a phase difference of $\pi(2M-1)/N$ between adjacent chip pulses.

In FIG. 12, the vertical axis shows the energy of the optical carrier wave of the encoded optical pulse signal per channel, in units of dBm. In FIG. 12, the horizontal axis shows a bar-chart of the encoded optical pulse signals per channel for cases of Bragg reflectivity of the encoder for each channel of 1.44%, 4.13%, and 9.13%, with the left hand side a case where a configuration OCDM signal generator is employed and the right hand side a case where the OCDM signal generator of an exemplary embodiment is employed.

As shown in FIG. 12, when the Bragg reflectivity of the encoder of each channel is 1.44%, 4.13%, and 9.13%, respective advantages of 6.0 dB, 6.0 dB, and 6.0 dB are obtained. It can be seen that, according to the four-fold OCDM signal generator of an exemplary embodiment configured employing a code determining the time spreading rule to impart conditions of a phase difference of $\pi(2M-1)/N$ between adjacent chip pulses, even if the Bragg reflectivity of the encoder of each channel is raised as high as 9.13%, a high advantage of 6.0 dB is obtained.

Figure 13A:
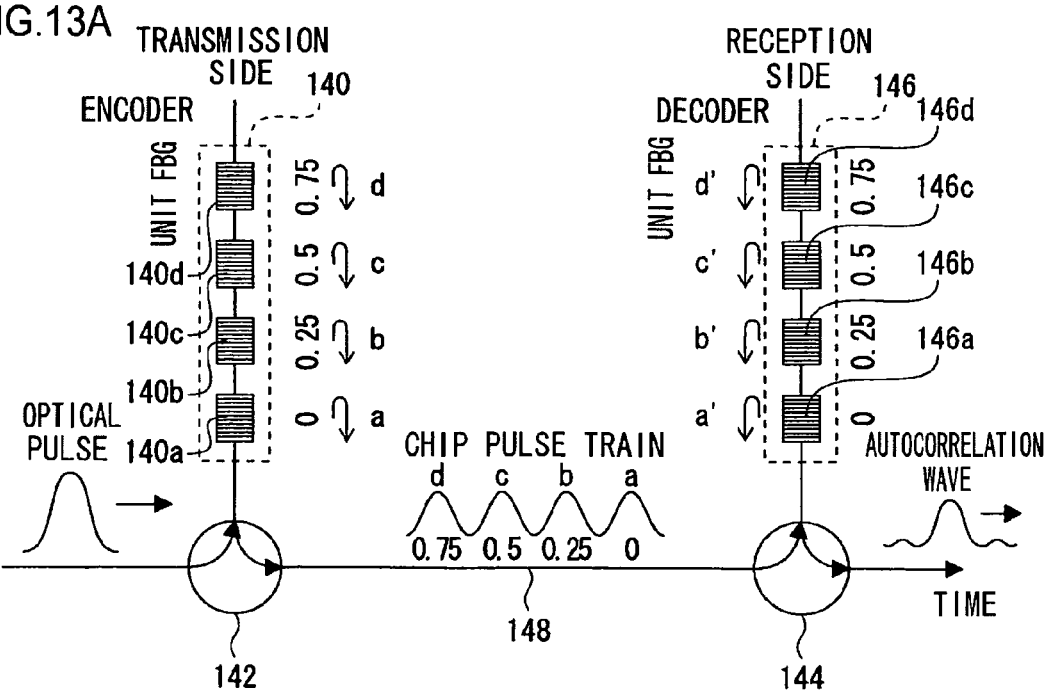
FIG. 13A to FIG. 13C are diagrams accompanying explanation of operation principles for generating a chip pulse train with an encoder, and for decoding optical pulses from the chip pulse train with a decoder, utilizing a pair of SSFBG's manufactured with the same refractive index periodic structure.
Figure 13B:
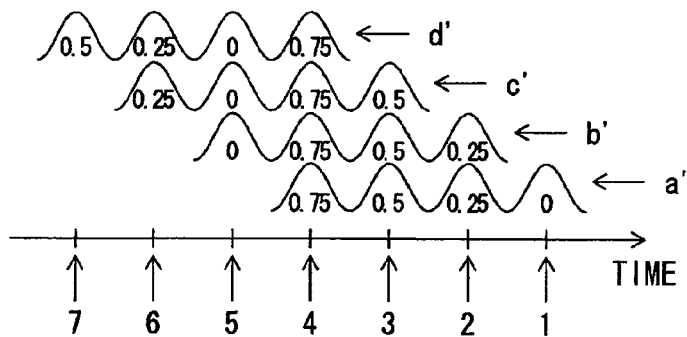
Figure 13C:
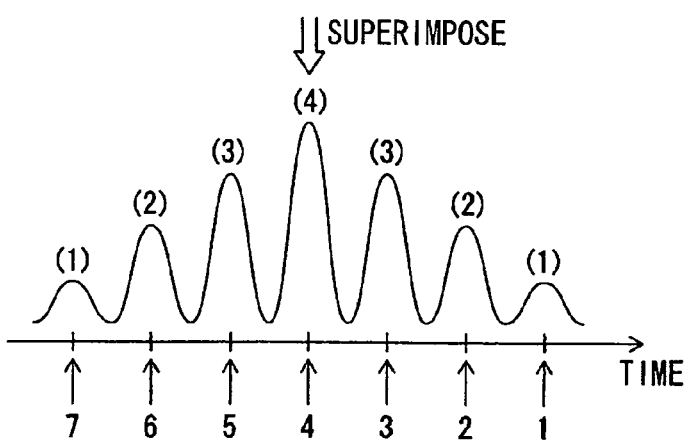

Explanation follows, with reference to FIG. 13A to FIG. 13C, regarding the decoding operation principles for generating the chip pulse train and for decoding the optical pulses from the chip pulse train, employing a pair of encoder and decoder manufactured with the same refractive index periodic structure. FIG. 13A is a diagram to accompany explanation of the operation principles, FIG. 13B is a diagram showing the time waveform of chip pulses a', b', c' and d' respectively Bragg reflected from unit FBG's 146a, 146b, 146c, and 146d, and FIG. 13C shows the time waveform of an autocorrelation wave of an input optical pulse decoded in the decoder 146.

FIG. 13A shows a schematic configuration example of encoding and decoding, with the encoder 140 and the decoder 146 pair. In FIG. 13A, an example is given where the encoder and decoder are provided with four unit FBG's, namely N=4, however, except for the different number of chip pulses, the operation principles for generating chip pulse trains, these being encoded optical pulse trains, and decoding optical pulses from the chip pulse trains, are similar to that of the following explanation for other cases than when N=4.

As shown in FIG. 13A, an input optical pulse is input to the encoder 140 via an optical circulator 142, time spread, and output as a chip pulse train, again via the optical circulator 142. The encoder 140 shown in FIG. 13A is an encoder configured with four unit FBG's arrayed along the waveguide direction of the optical fiber. Consequently, the number of individual chip pulses, output from the encoder 140 and arranged on the time axis, is also four.

When the optical pulse is input to the encoder 140, Bragg reflection light a, b, c, and d is generated and output respectively from the unit FBG's 140a, 140b, 140c, and 140d. The relative phases of the respective Bragg reflection light a, b, c, and d are "0", "0.25", "0.5", and "0.75". The relative phase values, as expressed in a number array, are (0, 0.25, 0.5, 0.75).

The decoder 146 shown in FIG. 13A has the same refractive index periodic structure to that of the encoder 140, and is also set with the same input and output end. In the encoder 140 and the decoder 146 shown in FIG. 13A, the phase difference between adjacent chip pulses is equivalent to $\pi/4$. Namely, the smallest unit of relative phase given by (0, 0.25, 0.5, 0.75) as the number array of the relative phase values for setting in the unit FBG's configuring the encoder 140 and the decoder 146 is "$\pi/4$", namely "0.25". The number array of relative phase values is expressed here with only the constant parts, and it omitted.

Namely, in the number array notation of relative phase values, when the phase difference is $\pi/4$ between adjacent chip pulse, the phase of the chip pulse Bragg reflected from the unit FBG disposed at the optical pulse input-output end side is shown as 0, and notation shows as the relative phase the phase difference to the chip pulse Bragg reflected from this unit FBG Consequently, the relative phase of the chip pulse Bragg reflected by the unit FBG disposed adjacent to the optical pulse input-output end side of the optical pulses is $\pi/4$, the relative phase of the chip pulse Bragg reflected by the unit FBG disposed next adjacent is $2\pi/4$, and the relative phase of the chip pulse Bragg reflected by the unit FBG disposed next adjacent is $3\pi/4$. Therefore, by omitting $\pi$ and expressing as decimals the expression becomes (0, ¼, 2/4, ¾)=(0, 0.25, 0.5, 0.75).

When a single optical pulse is input to the encoder 140 through the optical circulator 142, as shown in FIG. 13A, Bragg reflected light is generated from the unit FBG's 140a, 140b, 140c, and 140d. The Bragg reflected light from the unit FBG's 140a, 140b, 140c, and 140d is denoted as a, b, c, and d, respectively. Namely, the single optical pulse shown in FIG. 13A is time spread as Bragg reflected light a, b, c, and d, and converted into an encoded optical pulse train.

The Bragg reflected light a, b, c, and d, when shown against the time axis, is time spread into four optical pulses, as shown above an optical fiber transmission path 148 connecting the transmission side to the reception side of the FIG. 13A, and configures a particular chip pulse train on the time axis that depends on the unit FBG's 140a, 140b, 140c, and 140d. Consequently, the chip pulse train is a chip pulse train of the optical pulse input to the encoder, time dispersed as plural chip pulses on the time axis.

The relative phases of the Bragg reflected light a, b, c, and d configuring this chip pulse train are (0, 0.25, 0.5, 0.75), as shown. The phase difference between the Bragg reflected light a and the Bragg reflected light b is "0.25". The phase difference between the Bragg reflected light b and the Bragg reflected light c is "0.25", and the phase difference between the Bragg reflected light c and the Bragg reflected light d is "0.25".

The chip pulse train output from the optical circulator 142 propagates along the optical fiber transmission path 148, and is input to the decoder 146 via an optical circulator 144. The decoder 146 is of the same structure as the encoder 140, and the input-output end is also the same. Namely, the unit FBG's 140a, 140b, 140c, and 140d are arranged in sequence from the input-output end of the encoder 140, and the unit FBG's 146a, 146b, 146c, and 146d are similarly arranged in sequence from the input-output end of the decoder 146.

Explanation follows, with reference to FIG. 13B and FIG. 13C, of the process by which the chip pulse train output from the encoder 140 is input to the decoder 146, and output as an autocorrelation wave. FIG. 13B and FIG. 13C are diagrams to accompany explanation of the process by which an autocorrelation wave is generated from the chip pulse train.

FIG. 13B is a diagram showing a time waveform of chip pulses a', b', c' and d' generated by Bragg reflection from the unit FBG's 146a, 146b, 146c, and 146d, respectively, with the horizontal axis thereof as the time axis. For convenience numerals from "1" to "7" are allocated to represent the passage of time, with the smaller the number shown the earlier the time.

When the chip pulse train is input to the decoder 146, it is first Bragg reflected by the unit FBG 146a. The reflected light that is Bragg reflected at the unit FBG 146a is shown as Bragg reflected light a'. Similarly, the reflected light that is Bragg reflected at the unit FBG 146b, the unit FBG 146c, and the unit FBG 146d are represented by Bragg reflected light b', c' and d', respectively.

The chip pulses a, b, c, and d configuring a chip pulse train are Bragg reflected by the unit FBG 146a, and are arranged on the time axis as shown by a' in FIG. 13B. The chip pulse that has been Bragg reflected by the unit FBG 146a is an optical pulse having a peak at a position shown on the time axis as "1". The chip pulse b that has been Bragg reflected by the unit FBG 146a is an optical pulse having a peak position shown on the time axis as "2". Similarly, the chip pulses c and d Bragg that have been reflected by the unit FBG 146a are optical pulses having peaks positions shown on the time axis as "3" and "4".

The optical pulses a, b, c, and d configuring a chip pulse train are also Bragg reflected by the unit FBG 146b, and are arranged on the time axis as shown by b' in FIG. 13B. The Bragg reflected light b' reflected from the unit FBG 146b is increased by "0.25" relative to the Bragg reflected light a'. Consequently, relative to the chip pulse train arranged on the time axis shown by a', the chip pulse train arranged on the time axis shown by b' are values to which "0.25" has been added to the relative phase of each chip pulse. Namely, relative to the relative phases of (0, 0.25, 0.5, 0.75) from the right hand side towards the left hand side of the chip pulse train arranged on the time axis shown by a', the relative phase values of the chip pulse train arranged on the time axis shown by b' are, from the right hand side toward the left hand side, values to which "0.25" has been added, (0.25, 0.5, 0.75, 0).

If "0.25" is simply added then the relative phase of the train shown by b' becomes (0.25, 0.5, 0.75, 1), however the reason why the fourth (last) term is shown as "0" rather than "1" is that, as already explained above, the relative phase values "0" and "1" both have the same meaning as phases.

Similarly, for the chip pulse train arranged on the time axis shown as c', "0.5" is added to the relative phase values of the chip pulse train shown by a' (0, 0.25, 0.5, 0.75), becoming (0.5, 0.75, 1.0, 1.25)=(0.5, 0.75, 0.0, 0.25). Furthermore, for the chip pulse train arranged on the time axis shown as d', "0.75" is added to the relative phase values of the chip pulse train shown by a' (0, 0.25, 0.5, 0.75), becoming (0.75, 1.0, 1.25, 1.5)=(0.75, 0.0, 0.25, 0.5).

FIG. 13C shows an autocorrelation wave of an input optical pulse decoded by the decoder 146. The horizontal axis is the time axis, and the time axis is aligned with that shown in FIG. 13B. The autocorrelation wave is that provided by the Bragg reflected light a', b', c', and d' from each of the unit FBG's of the decoder 146, and so is derived by adding together all of the Bragg reflected light a', b', c', and d', as shown in FIG. 13B. The times shown as 4 on the time axis of FIG. 13C is when the optical pulses related to Bragg reflected light a', b', c', and d' are all added together in the same phase, configuring the maximum peak. Furthermore, each of the chip pulses also are superimposed with the same phase at other times to that shown by 4 on the time axis of FIG. 13C, however, the number of superimposed chip pulses is less than 4 at these times (3, 2, or 1), and so the peaks thereof are smaller than the maximum peak at the time shown by 4.

As explained above, the optical pulse that is time spread in the encoder 140 gives a chip pulse train, and an autocorrelation wave is generated by inputting this chip pulse train to the decoder 146. In the example given, 4 bits of relative phase (0, 0.25, 0.5, 0.75) are employed, however the above explanation similarly applies to cases when the relative phases are other than these.

The autocorrelation wave shown in FIG. 13C can be viewed as being generated by the flowing mechanism. The peak waveform formed at the position on the time axis shown by "1" is formed by the Bragg reflected light a' due to the chip pulse a being reflected from the unit FBG 146a. Consequently, the amplitude of the peak waveform shown at the position shown on the time axis by "1" is equivalent to the amplitude of the chip pulse.

The peak waveform formed at the position on the time axis shown by "2" is formed by the sum of the Bragg reflected light b', due to the chip pulse b being reflected from the unit FBG 146a, and the Bragg reflected light a', due to the chip pulse a being reflected from the unit FBG 146b. The sum of these two components is the sum of optical chip pulses together of the same phase, the relative phase of both being "0.25", and so the amplitude thereof is twice the amplitude of the chip pulse.

The amplitude of the peak waveforms formed at the positions on the time axis shown by "3" to "7" are for peak waveforms generated by the same mechanism as described above, and are 3 times, 4 times, 3 times, 2 times and 1 times the amplitude of the respective chip pulses. In FIG. 13C, how many times the respective peak waveforms amplitudes are, of the chip pulse amplitude, is shown in brackets at the respective peak positions on the peak waveform. The total of these peak waveform amplitudes, totaling in sequence of the peak waveform formed on the time axis from "1" to "7" is 1+2+

3+4+3+2+1=16. When this is converted into energy, this is 256 times (=$16^2$ times) that of one chip pulse's worth. Namely, the total energy of the autocorrelation wave is 256 times the energy of one chip pulse's worth.

In the explanation above, explanation has been given of a case where each of the unit FBG's configuring the encoder 140 and the decoder 146 are set with the same relative phase. Namely, a case is explained wherein, after time spreading into the chip pulse train by the encoder 140, the chip pulse train is input to the decoder 146, and generation and output is made as an autocorrelation wave.

Explanation follows of a case where the encoder and the decoder are set with different codes.

Figure 14A:
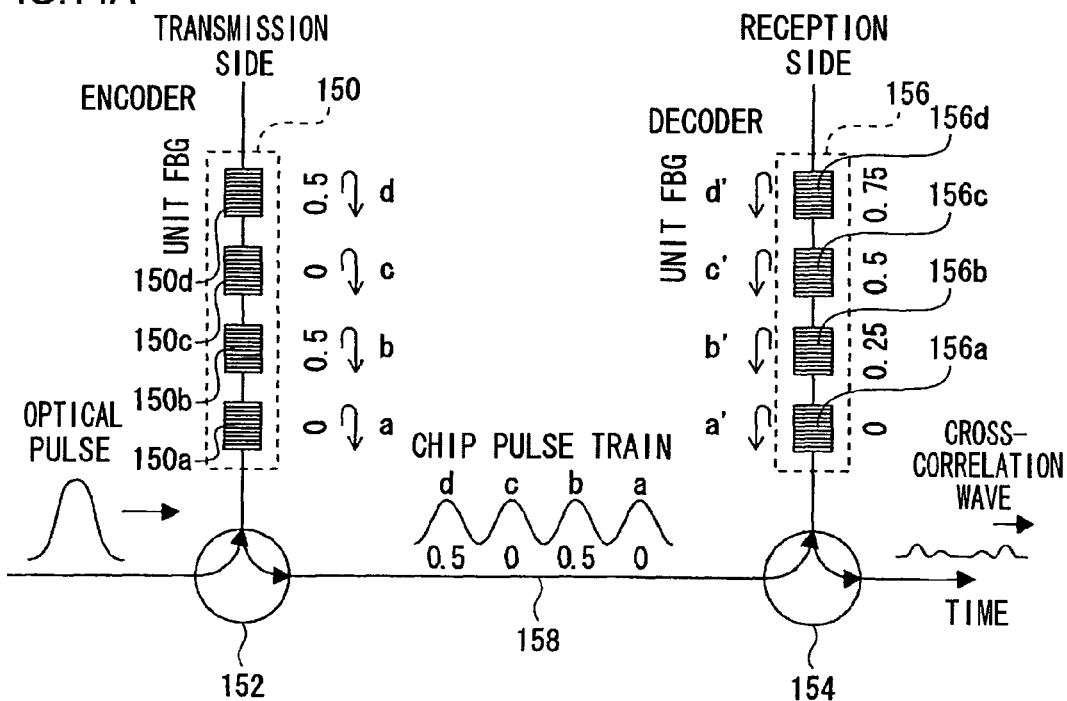
FIG. 14A to FIG. 14C are diagrams to accompany explanation of operation principles for generating a chip pulse train, and for decoding the chip pulse train and recovering optical pulses using a pair of an encoder an a decoder set with different codes.
Figure 14B:
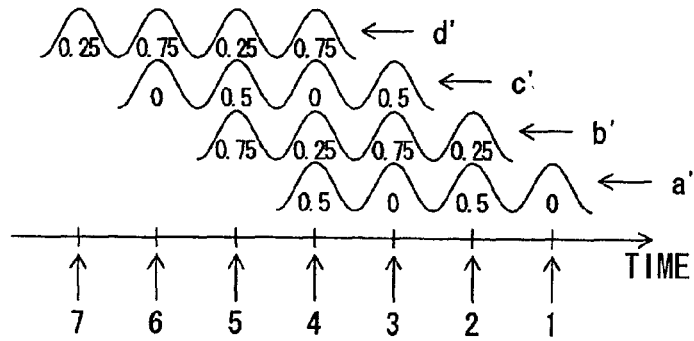
Figure 14C:
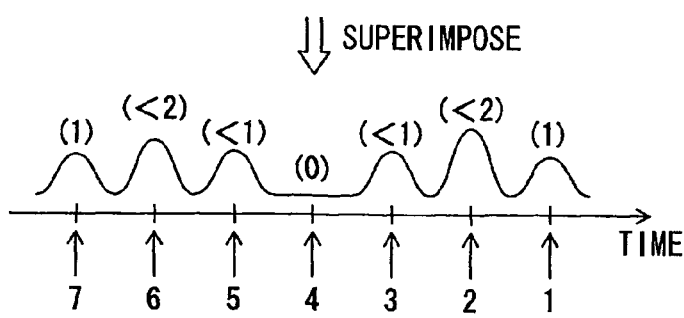

FIG. 14A to FIG. 14C are diagrams to accompany explanation of operation principles for generating chip pulse trains and decoding optical pulse from the chip pulse trains when a pair of encoder and decoder built into different refractive index periodic structures are employed. FIG. 14A is a diagram to accompany explanation of the operation principles, FIG. 14B is a diagram showing the time waveform of chip pulses a', b', c' and d', respectively Bragg reflected from unit FBG's 156a, 156b, 156c, and 156d, and FIG. 14C shows the time waveform of a cross-correlation wave of an input optical pulse decoded in the decoder 156. In FIG. 14A to FIG. 14C, the same as in FIG. 13A to 13C, an example is given of an optical pulse time spreading device provided with four unit FBG's, namely a case where N=4.

As shown in FIG. 14A, a input optical pulse is input to an encoder 150 via an optical circulator 152, time spread, and output as a chip pulse train, again via the optical circulator 152. The encoder 150 shown in FIG. 14A is an SSFBG configured with four unit FBG's arrayed along the waveguide direction of the optical fiber. Consequently, the number of individual chip pulses output from the encoder 150, arranged over the time axis, is also four.

The unit FBG's 150a, 150b, 150c, and 150d configuring the encoder 150 each respectively correspond to a first chip a, second chip b, third chip c, and fourth chip d of the optical phase code described above.

When an optical pulse is input to the encoder 150, Bragg reflection light a, b, c, and d is generated and output respectively from the unit FBG's 150a, 150b, 150c, and 150d. The relative phases of the respective Bragg reflection light a, b, c, and d are "0", "0.5", "0", and "0.5". The relative phase values, as expressed in a number array, are (0, 0.5, 0, 0.5). Namely, the smallest unit of relative phase is "0.5". In contrast, in the decoder 156, the relative phase values of the respective Bragg reflected light a, b, c, and d, as expressed in a number array, are (0, 0.25, 0.5, 0.75). Namely, the smallest unit of relative phase of the decoder 156 is "0.25".

Explanation follows regarding the processes for time spreading in the encoder 150, converting into a chip pulse train, and by which this chip pulse train is formed into a cross-correlation wave by the decoder 156.

When the single optical pulse shown in FIG. 14A is input to the encoder 150 via an optical circulator 152, Bragg reflected light is generated from the unit FBG's 150a, 150b, 150c, and 150d. The Bragg reflected light from the unit FBG's 150a, 150b, 150c, and 150d is referred to as light a, b, c, and d, respectively. Namely, the single optical pulse shown in FIG. 14A is time spread as the Bragg reflected light a, b, c, and d, and converted into an encoded optical pulse train.

When the Bragg reflected light a, b, c, and d is shown against the time axis, it is time spread into four optical pulses, as shown above an optical fiber 158 connecting the transmission side to the reception side in FIG. 14A, configuring a particular chip pulse train on the time axis that depends on the unit FBG's 150a, 150b, 150c, and 150d. Consequently, the chip pulse train is a chip pulse train of the optical pulse input to the encoder, time spread as plural chip pulses on the time axis.

The relative phases of the Bragg reflected light a, b, c, and d configuring this chip pulse train are (0, 0.5, 0, 0.5), as shown. The phase difference between the Bragg reflected light a and the Bragg reflected light b is "0.5". The phase difference between the Bragg reflected light b and the Bragg reflected light c, and the phase difference between the Bragg reflected light c and the Bragg reflected light d is "0.5".

The chip pulse train output from the optical circulator 152 propagates along the optical fiber transmission path 158, and is input to the decoder 156 via an optical circulator 154.

Explanation follows, with reference to FIG. 14B and FIG. 14C, of the process by which the chip pulse train output from the encoder 150 is input to the decoder 156, and generated and output as a cross-correlation wave. FIG. 14B and FIG. 14C are diagrams to accompany explanation of the process by which an autocorrelation wave is generated from the chip pulse train.

FIG. 14B is a diagram showing a time waveform of chip pulses a', b', c' and d' generated by Bragg reflection from the unit FBG's 156a, 156b, 156c, and 156d, respectively, with the horizontal axis thereof as the time axis. For convenience numerals from "1" to "7" are allocated to represent the passage of time, with the smaller the number shown the earlier the time.

When the chip pulse train is input to the decoder 156, it is first Bragg reflected by the unit FBG 156a. The reflected light that is Bragg reflected at the unit FBG 156a is shown as Bragg reflected light a'. Similarly, the reflected light that is Bragg reflected at the unit FBG 156b, the unit FBG 156c, and the unit FBG 156d are represented by Bragg reflected light b', c' and d', respectively.

The chip pulses a, b, c, and d configuring a chip pulse train are Bragg reflected by the unit FBG 156a, and are arranged on the time axis as shown by a' in FIG. 14B. The chip pulse that has been Bragg reflected by the unit FBG 156a is an optical pulse having a peak at a position shown on the time axis as "1". The chip pulse b that has been Bragg reflected by the unit FBG 156a is an optical pulse having a peak position shown on the time axis as "2". Similarly, the chip pulses c and d Bragg reflected by the unit FBG 156a are optical pulses having peaks positions shown on the time axis as "3" and "4".

The optical pulses a, b, c, and d configuring a chip pulse train are also Bragg reflected by the unit FBG 156b, and are arranged on the time axis as shown by b' in FIG. 14B. The Bragg reflected light b' reflected from the unit FBG 156b is increased by "0.25" relative to the Bragg reflected light a'. Consequently, relative to the chip pulse train arranged on the time axis shown by a', the chip pulse train arranged on the time axis shown by b' are values to which "0.25" has been added to the relative phase of each chip pulse. Namely, relative to the relative phase from the right hand side towards the left hand side of the chip pulse train arranged on the time axis shown by a' of (0, 0.5, 0, 0.5), the relative phase values of the chip pulse train arranged on the time axis shown by b' are, from the right hand side toward the left hand side, values to which "0.25" has been added, (0.25, 0.75, 0.25, 0.75).

Similarly, for the chip pulse train arranged on the time axis shown as c', "0.5" is added to the relative phase values of the chip pulse train shown by a' (0, 0.5, 0, 0.5), becoming (0.5, 0, 0.5, 0). Furthermore, for the chip pulse train arranged on the time axis shown as d', "0.75" is added to the relative phase values of the chip pulse train shown by a' (0, 0.5, 0, 0.5), becoming (0.75, 1.25, 0.75, 1.25)=(0.75, 0.25, 0.75, 0.25).

FIG. 14C shows a cross-correlation wave of an input optical pulse decoded by the decoder 156. The horizontal axis is the time axis, and the time axis is aligned with that shown in FIG. 14B. The cross-correlation wave is that provided by the Bragg reflected light a', b', c', and d' shown in FIG. 14B from each of the unit FBG's of the decoder 156, and so is derived by adding together all of the Bragg reflected light a', b', c', and d'.

At the time shown as "1" on the time axis of FIG. 14C, since it is a peak formed by only the chip pulse furthest to the right hand side in the Bragg reflected light a', the amplitude thereof is equivalent to one chip pulse's worth. At the time shown as "2" on the time axis, a peak is formed from the sum of the chip pulse second from the right hand side in the Bragg reflected light a', and the chip pulse furthest to the right hand side in the Bragg reflected light b'. Since the phases of these two chip pulses are "0.5" and "0.25", the peak formed by the sum thereof has an amplitude smaller than two chip pulses worth. This is shown in FIG. 14C as (<2).

Similarly, the amplitude of the peak at the time shown by "3" on the time axis is smaller than one chip pulse's worth, the amplitude of the peak at the time shown by "5" on the time axis is smaller than one chip pulse's worth, and the amplitude of the peak at the time shown by "6" on the time axis is smaller than two chip pulses worth. At the time shown by "4" on the time axis, the superimposed chip pulses exactly cancel each other out, and so the amplitude is "0". Furthermore, at the time shown as "7" on the time axis, since it is a peak formed by only the chip pulse furthest to the left hand side in the Bragg reflected light d', the amplitude thereof is equivalent to one chip pulse's worth.

In FIG. 14C, how many times the respective peak waveforms amplitudes are of the chip pulse amplitude is shown in brackets at the respective peak positions on the peak waveform. The total of these peak waveform amplitudes, totaling in sequence of the peak waveforms formed on the time axis shown in positions "1" to "7" is smaller than 1+2+1+0+1+2+1=8. When this is converted into energy, this is a value smaller than 64 times (=$8^2$ times) that of one chip pulse's worth. Namely, the total energy of the cross-correlation wave is less than 64 times the energy of one chip pulse's worth.

Figure 15:
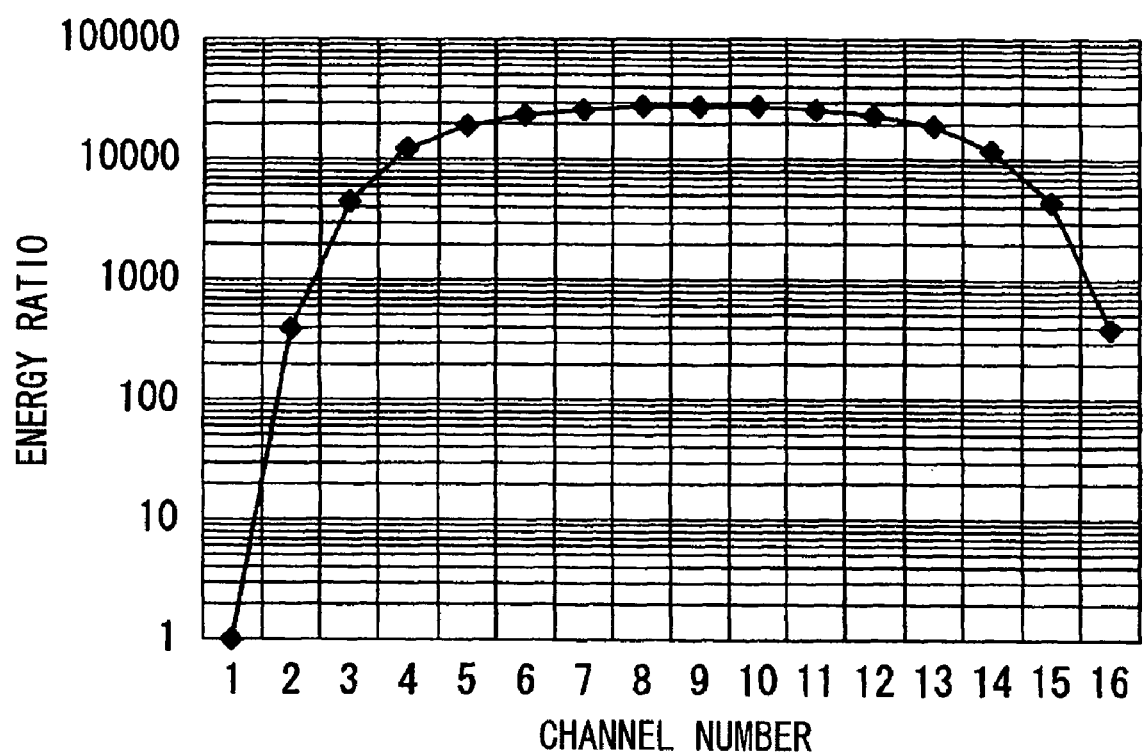
FIG. 15 is a diagram showing a comparison of the autocorrelation wave component and the cross-correlation wave component of a decoded optical pulse train output from the first to the $16^{th}$ decoder when an encoded pulse train that has been encoded by the first encoder is decoded by the first to the $16^{th}$ decoders, respectively.

Explanation follows taking an example of a case where N=16 (16 channel multiplexing), with reference to FIG. 15, of the ratio of the autocorrelation wave component and the cross-correlation wave component when an encoded optical pulse train encoded by the first encoder is decoded by the first to the sixteenth encoders. Explanation follows, with reference to FIG. 15, of a case where the OCDM signal generator of an exemplary embodiment is employed as an encoder and decoder pair for encoding and decoding, with one of the devices provided with a first to $N^{th}$ encoders, and the other device provided with a first to $N^{th}$ decoders.

During the explanation the $j^{th}$ encoder and the $j^{th}$ decoder are of the same structure. j is a parameter that adopts all integer values between 1 and N. Namely, if encoding is by the first encoder and decoding is by the first decoder, then the decoded optical pulse regenerates the optical pulse signal prior to encoding. However, if encoding is by the first encoder and decoding is by one or other of the second to the $N^{th}$ decoder, then in non of the cases is the optical pulse regenerated.

FIG. 15 is a diagram showing a comparison of the autocorrelation wave component and the cross-correlation wave component of a decoded optical pulse train output from the first to the $16^{th}$ decoder when an encoded pulse train that has been encoded by the first encoder is decoded by the first to the $16^{th}$ decoders, respectively. In FIG. 15, the horizontal axis shows the first decoder to the $16^{th}$ decoder, and the vertical axis shows the energy ratio of the peak of the autocorrelation wave to the peak of the cross-correlation wave on a logarithmic scale.

When encoding is by the first encoder and decoding is by the first decoder, the optical pulse train prior to input to the first encoder is regenerated, since the codes set in both are the same as each other. Namely, the cross-correlation component is "0", and the energy ratio of peak of the autocorrelation wave to the peak of the cross-correlation wave is 1.

However, the phase structures of the first encoder and the second encoder, or the first encoder and the $16^{th}$ encoder, are close to each other. Namely, since the phase difference between adjacent chip pulses for the first encoder and the first decoder is $\pi/16$, for the second encoder and the second decoder is $3\pi/16$, . . . , for the $16^{th}$ encoder and the $16^{th}$ decoder is $31\pi/16$, the relationship with the greatest phase difference between adjacent chip pulses is that of the first encoder to that of the eighth or the ninth decoder. Furthermore, the phase difference between adjacent chip pulses in the first encoder is $\pi/16$, and the phase difference between adjacent chip pulses in the $16^{th}$ decoder is $31\pi/16$.

Since the period is the same phase at $2\pi$, having a phase difference of $31\pi/16$ is in reality equivalent to a level of $3\pi/16$. Therefore, as shown in FIG. 15, the ratio of the autocorrelation wave and the cross-correlation wave when decoded by the second decoder, and the ratio of the autocorrelation wave and the cross-correlation wave when decoded by the $16^{th}$ decoder, are equivalent values.

From this it can be seen that when decoded with a decoder with a close phase difference between adjacent chip pulses, the ratio of the autocorrelation wave and the cross-correlation wave gets smaller, and extracting the autocorrelation wave component becomes more difficult. However, as shown in FIG. 15, it can be seen that there is still a ratio of the autocorrelation wave and the cross-correlation wave of about 400 times when encoding is by the first encoder and decoding is with the $16^{th}$ decoder, the relationship with the closest phase difference between adjacent chip pulses.

As explained above, according to the OCDM signal generator of the first exemplary embodiment, the first to the $N^{th}$ encoders, the first to the $N^{th}$ optical circulators, and the first to the $N^{th}$ optical modulators are provided, and configuration is made with the optical pulse train that has passed through the encoder disposed at a previous stage input to the encoder disposed at the following stage, such that the $(k-1)^{th}$ optical pulse train that has passed through the $(k-1)^{th}$ encoder is input to the $k^{th}$ encoder. Configuration is then made such that the optical pulse train output from the $k^{th}$ optical circulator is input to the $k^{th}$ optical modulator. Consequently, apart from the $N^{th}$ encoder situated at the final stage, all the energy of the optical carrier waves of the optical pulse trains that have passed through the first to the $(N-1)^{th}$ encoders is used for input to the encoder of the following stage.

Consequently, the optical pulse trains, these being optical signal components, that have passed through from the optical pulse time spreading device that is the encoder, can be effectively utilized to generated the encoded optical pulse train in the optical pulse time spreading device of the following stage. Consequently, configuration is made in which it is possible to reduce the optical carrier wave energy loss that occurs in the OCDM transmission signal generation process.

According to the OCDM signal generator of the first exemplary embodiment, configuration is made in which for the second to the $(N-1)^{th}$ encoders, the output from the encoder disposed at the previous stage is input to the encoder disposed at the following stage, and configuration is made in which the encoded optical pulse train output by Bragg reflection by the first to the $N^{th}$ encoders is output from the first to the $N^{th}$ optical circulators. Therefore, an optical splitter, required in the conventional OCDM signal generator for splitting the optical pulse train into divisions of the number of channels required for input of the optical pulse trains to the respective first to the $N^{th}$ encoders, is not required. Consequently, it is possible to remove the energy loss generated by the optical splitter to the optical carrier wave.

Note that the OCDM signal generator need not necessarily always be provided with functionality to multiplex an encoded transmission signal of N channels worth. The number of channels for multiplexing is determined depending on how much multiplexing of channels is required in an OCDM transmission system configured using the OCDM signal generators. In general terms, a number of channels that is N or fewer may be provided, namely, functionality for multiplexing encoded transmission signals of M channels worth (where M is a positive integer that satisfies $2 \leq M \leq N$).

In the OCDM signal generator of the first exemplary embodiment, each of the first to the $M^{th}$ encoders is an optical pulse time spreading device provided with a SSFBG configured of a first to an $N^{th}$ unit FBG's with a structure in which the effective refractive index of the optical fiber periodically changes disposed along the length direction of the optical fiber, and with respective phase shifters having a constant refractive index disposed between an $i^{th}$ unit FBG and an $(i+1)^{th}$ unit FBG Here, i is a parameter that takes all integers satisfying $1 \leq i \leq N-1$.

Then the optical pulse input to the SSFBG provided with the $M^{th}$ encoder is time spread and output as a chip pulse train which comprises N individual chip pulses from a first chip pulse to an $N^{th}$ chip pulse arranged along the time axis. The adjacently disposed $i^{th}$ unit FBG and the $(i+1)^{th}$ unit FBG; configuring the SSFBG provided with the $M^{th}$ encoder, are disposed at a spacing interval such that the phase difference between the chip pulse generated by reflection at the $i^{th}$ unit FBG and the chip pulse generated by reflection at the $(i+1)^{th}$ unit FBG is $\pi(2M-1)/N$.

The $(k-1)^{th}$ optical pulse train that has passed through the $(k-1)^{th}$ encoder suffers a loss of a portion of the frequency spectral component due to encoding in the $(k-1)^{th}$ encoder. However, due to configuration of the SSFBG provided with the first to the $M^{th}$ coders as described above, on passing through the $(k-1)^{th}$ encoder and being input to the $k^{th}$ encoder, the frequency of the spectral component lost due to encoding in the $k^{th}$ encoder is a different frequency spectral component to that lost due to encoding in the $(k-1)^{th}$ encoder as described above. Consequently, the encoding processing in the previous stage encoder does not affect the encoding processing in the following stage encoder.

Consequently, in the first to the $M^{th}$ encoders, respectively, even if there is loss to a portion of the frequency spectral component in another of the encoders, it is possible to perform encoding processing without being affected by such loss. It is thereby possible to generate encoded optical pulse trains with low noise in the first to the $M^{th}$ encoders, respectively.

The OCDM signal generator of the second exemplary embodiment is configured such that the first to the $N^{th}$ optical modulators provided to the OCDM signal generator of the first exemplary embodiment described above are unified into a single optical modulator, and similar processing is performed thereby. The only difference to the OCDM signal generator of the first exemplary embodiment is this feature, and configuration with the optical pulse train that has passed through the encoder disposed at a previous stage being input to the encoder disposed at the following stage, such that the $(k-1)^{th}$ optical pulse train that has passed through the $(k-1)^{th}$ encoder is input to the $k^{th}$ encoder, is a common feature to the OCDM signal generator of the first exemplary embodiment.

Consequently, the OCDM signal generator of the second exemplary embodiment is configured such that the optical pulse trains, these being optical signal components, that have passed through from the optical pulse time spreading device that is the encoder, can be effectively utilized to generate the encoded optical pulse train in the optical pulse time spreading device of the following stage, and an optical splitter for splitting the optical pulse train into divisions of the number of channels is not required.

Furthermore, the effect obtained by disposing the $i^{th}$ unit FBG and the $(i+1)^{th}$ unit FBG, configuring the SSFBG provided with the $M^{th}$ encoder, such that the phase difference between the chip pulse generated by reflection at the $i^{th}$ unit FBG and the chip pulse generated by reflection at the $(i+1)^{th}$ unit FBG is $\pi(2M-1)/N$, is similar to in the first OCDM signal generator described above.

What is claimed is:

1. An optical code division multiplexing signal generator comprising:

an optical pulse light source that generates and outputs an optical pulse train;

a first encoder to an $N^{th}$ encoder;

a first optical modulator to an $N^{th}$ optical modulator; and a first optical circulator to an $N^{th}$ optical circulator, wherein the first optical circulator is input with the optical pulse train and inputs the optical pulse train to the first encoder, and the first optical circulator is input with a first encoded optical pulse train which is output by Bragg reflection from the first encoder and inputs the first encoded optical pulse train to the first optical modulator, wherein a $k^{th}$ optical circulator is input with a $(k-1)^{th}$ optical pulse train which has passed through the $(k-1)^{th}$ encoder and inputs the $(k-1)^{th}$ optical pulse train to the $k^{th}$ encoder, and the $k^{th}$ optical circulator is input with a $k^{th}$ encoded optical pulse train which is output by Bragg reflection from the $k^{th}$ encoder and inputs the $k^{th}$ encoded optical pulse train to the $k^{th}$ optical modulator, and wherein k takes all integers from 2 to N, and N is a positive integer of 2 or more.

2. An optical code division multiplexing signal generator comprising:

an optical pulse light source that generates and outputs an optical pulse train;

a first encoder to an $M^{th}$ encoder;

a first optical modulator to an $M^{th}$ optical modulator; and a first optical circulator to an $M^{th}$ optical circulator, wherein the first optical circulator is input with the optical pulse train and inputs the optical pulse train to the first encoder, and the first optical circulator is input with a first encoded optical pulse train which is output by Bragg reflection from the first encoder and inputs the first encoded optical pulse train to the first optical modulator, wherein a $k^{th}$ optical circulator is input with a $(k-1)^{th}$ optical pulse train which has passed through the $(k-1)^{th}$ encoder and inputs the $(k-1)^{th}$ optical pulse train to the $k^{th}$ encoder, and the $k^{th}$ optical circulator is input with a $k^{th}$ encoded optical pulse train which is output by Bragg reflection from the $k^{th}$ encoder and inputs the $k^{th}$ encoded optical pulse train to the $k^{th}$ optical modulator, wherein each of the first to the $M^{th}$ encoders is an optical pulse time spreading device which comprises a super structured fiber Bragg grating (SSFBG) configured by disposing, along a length direction of an optical fiber, a first unit fiber Bragg grating (FBG) to an $N^{th}$ unit fiber Bragg grating (FBG) with a structure in which an effective refractive index of the optical fiber periodically changes, with disposing a phase shifter, which has a constant refractive index, between an $i^{th}$ unit FBG and an $(i+1)^{th}$ unit FBG;

wherein the SSFBG has functionality to time spread and output an optical pulse which is input to the SSFBG; as a chip pulse train which comprises N individual chip pulses from a first chip pulse to an $N^{th}$ chip pulse that are time spread and arranged in sequence over the time axis, the $i^{th}$ unit FBG and the $(i+1)^{th}$ unit FBG are adjacently disposed at a spacing interval such that a phase difference between a chip pulse which is generated by reflection at the $i^{th}$ unit FBG and a chip pulse which is generated by reflection at the $(i+1)^{th}$ unit FBG is $\pi(2M-1)/N$, and wherein i is a parameter which takes all integer values for which $1 \leq i \leq N-1$, N is an integer of 2 or more, k is a parameter which takes all integer values satisfying $2 \leq k \leq M$, and M is an integer which takes all values satisfying $2 \leq M \leq N$.

3. An optical code division multiplexing signal generator comprising:

an optical pulse light source that generates and outputs an optical pulse train;

a first encoder to an $N^{th}$ encoder;

an optical modulator; and a first optical circulator to an $N^{th}$ optical circulator, wherein the first optical circulator is input with the optical pulse train and inputs the optical pulse train to the first encoder, and the first optical circulator is input with a first encoded optical pulse train which is output by Bragg reflection from the first encoder and inputs the first encoded optical pulse train to the optical modulator, wherein a $k^{th}$ optical circulator is input with a $(k-1)^{th}$ optical pulse train which has passed through the $(k-1)^{th}$ encoder and inputs the $(k-1)^{th}$ optical pulse train to the $k^{th}$ encoder, and the $k^{th}$ optical circulator is input with a $k^{th}$ encoded optical pulse train which is output by Bragg reflection from the $k^{th}$ encoder and inputs the $k^{th}$ encoded optical pulse train to the optical modulator, and wherein k takes all integers from 2 to N, and N is a positive integer of 2 or more.

4. An optical code division multiplexing signal generator comprising:

an optical pulse light source that generates and outputs an optical pulse train;

a first encoder to an $M^{th}$ encoder;

an optical modulator; and a first optical circulator to an $M^{th}$ optical circulator, wherein the first optical circulator is input with the optical pulse train and inputs the optical pulse train to the first encoder, and the first optical circulator is input with a first encoded optical pulse train which is output by Bragg reflection from the first encoder and inputs the first encoded optical pulse train to the optical modulator, wherein a $k^{th}$ optical circulator is input with a $(k-1)^{th}$ optical pulse train which has passed through the $(k-1)^{th}$ encoder and inputs the $(k-1)^{th}$ optical pulse train to the $k^{th}$ encoder, and the $k^{th}$ optical circulator is input with a $k^{th}$ encoded optical pulse train which is output by Bragg reflection from the $k^{th}$ encoder and inputs the $k^{th}$ encoded optical pulse train to the optical modulator, wherein each of the first to the $M^{th}$ encoders is an optical pulse time spreading device which comprises a super structured fiber Bragg grating (SSFBG) configured by disposing, along a length direction of an optical fiber, a first unit fiber Bragg grating (FBG) to an $N^{th}$ unit fiber Bragg grating (FBG) with a structure in which an effective refractive index of the optical fiber periodically changes, with disposing a phase shifter, which has a constant refractive index, between an $i^{th}$ unit FBG and an $(i+1)^{th}$ unit FBG, wherein the SSFBG has functionality to time spread and output an optical pulse which is input to the SSFBG, as a chip pulse train which comprises N individual chip pulses from a first chip pulse to an $N^{th}$ chip pulse that are time spread and arranged in sequence over the time axis, wherein the $i^{th}$ unit FBG and the $(i+1)^{th}$ unit FBG are adjacently disposed at a spacing interval such that a phase difference between a chip pulse which is generated by reflection at the $i^{th}$ unit FBG and a chip pulse which is generated by reflection at the $(i+1)^{th}$ unit FBG is $\pi(2M-1)/N$, and wherein i is a parameter which takes all integer values for which $1 \leq i \leq N-1$, N is an integer of 2 or more, k is a parameter which takes all integer values satisfying $2 \leq k \leq M$, and M is an integer which takes all values satisfying $2 \leq M \leq N$.

* * * * *